(12) United States Patent
Nelson et al.

(10) Patent No.: US 10,458,820 B2
(45) Date of Patent: Oct. 29, 2019

(54) POSITION SENSOR MOUNTS FOR A DIAGNOSTIC SYSTEM FOR FLUID CONTROL VALVES

(71) Applicant: FISHER CONTROLS INTERNATIONAL LLC, Marshalltown, IA (US)

(72) Inventors: Philip D. Nelson, Union, IA (US); Thomas A. Imsland, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/178,060

(22) Filed: Jun. 9, 2016

(65) Prior Publication Data
US 2017/0082467 A1 Mar. 23, 2017

Related U.S. Application Data

(60) Provisional application No. 62/220,371, filed on Sep. 18, 2015.

(51) Int. Cl.
*F16M 13/02* (2006.01)
*F16M 11/28* (2006.01)
(Continued)

(52) U.S. Cl.
CPC ........ *G01D 11/245* (2013.01); *F16K 37/0041* (2013.01); *F16K 37/0083* (2013.01); *F16M 11/28* (2013.01); *F16M 13/022* (2013.01)

(58) Field of Classification Search
CPC ........... B25B 1/205; B25B 5/068; B25B 5/06; B25B 5/16; F16M 13/022; F21V 21/116;
(Continued)

(56) References Cited

U.S. PATENT DOCUMENTS 2,623,618 A 12/1952 Howard
3,964,738 A 6/1976 Owen
(Continued)

FOREIGN PATENT DOCUMENTS

CN 206617655 U 11/2017
DE 102013104413 B3 7/2014
WO WO-2010/045504 A1 4/2010

OTHER PUBLICATIONS

Bessey Tools Canada, Grip Pliers—SuperGrips™, http://www.besseytools.com/en/product_details.php?ASIMOID=0000000100036e6e00030023&ASIMOID_SC=00000000000364c100040023&ASIMOID_MC=000000000001f07600030023 (2013).

(Continued)

*Primary Examiner* — Brandi N Hopkins
(74) *Attorney, Agent, or Firm* — Marshall, Gerstein & Borun LLP

(57) ABSTRACT

Position sensor mounts for mounting one or more position sensors to one or more various fluid control valves and/or actuators for such valves. One such position sensor mount includes a base, a toggle clamp fixedly attached to the base, and an engagement assembly. The base has a mount for coupling to a position sensor and a first clamp jaw. The toggle clamp has a second clamp jaw that opposes the first clamp jaw. The toggle clamp automatically adjusts to provide a fixed clamping force at different distances between the first clamp jaw and the second clamp jaw. The engagment assembly is carried by the second jaw and includes at least a first clamp pad having a distal end that directly faces the first clamp jaw and swivels relative to the second clamp jaw.

24 Claims, 12 Drawing Sheets

(51) Int. Cl.
*F16K 37/00* (2006.01)
*G01D 11/24* (2006.01)

(58) Field of Classification Search
CPC ......... F21W 2111/02; G09F 2007/1813; G09F 7/18; G09F 2007/1808; G01B 5/163
See application file for complete search history.

(56) References Cited

U.S. PATENT DOCUMENTS

| | | | |
|---|---|---|---|
| 4,378,937 A | 4/1983 | Dearman | |
| 4,747,588 A | 5/1988 | Dillhoff | |
| 4,860,985 A * | 8/1989 | Olson | F21V 21/116 248/214 |
| 4,976,144 A | 12/1990 | Fitzgerald | |
| 5,478,038 A * | 12/1995 | Thorp | F16M 13/022 248/230.9 |
| 5,563,349 A | 10/1996 | Burke et al. | |
| 2003/0197147 A1 | 10/2003 | Fortino et al. | |
| 2009/0194924 A1* | 8/2009 | Ben-Gigi | B25B 1/205 269/165 |
| 2010/0038936 A1 | 2/2010 | Gibson et al. | |
| 2013/0068974 A1 | 3/2013 | Galka et al. | |
| 2014/0299040 A1* | 10/2014 | Labat | G01B 3/48 116/201 |

OTHER PUBLICATIONS

Bessey Tools Canada, Grip Pliers—Auto-Adjust Toggle Clamps—Horizontal, http://www.besseytools.com/en/product_details.php?ASIMOID=000000020003ca5e00050023&ASIMOID_SC=000000030000da0d00030023&ASIMOID_MC=000000000001f07600030023 (2013).
Baitella AG, Fisso Swiss Made catalog; "3D articulated arms Innovative high-quality products;" (2014).
Emerson Process Management, Product Bulletin; "FlowScanner™ 6000 Valve Diagnostic System," Product Bulletin, (Jul. 2008).
Office Action, Chinese Patent Application No. 201610833775.6, dated Feb. 3, 2019.
International Search Report for PCT/US2016/052110, dated Dec. 2, 2016.
Written Opinion for PCT/US2016/052110, dated Dec. 2, 2016.
Office Action received in European Patent Application No. 16 788 520.3, dated Apr. 10, 2019.

* cited by examiner

POSITION SENSOR MOUNTS FOR A DIAGNOSTIC SYSTEM FOR FLUID CONTROL VALVES

This application claims the benefit of Provisional U.S. Patent Application No. 62/220,371, filed Sep. 18, 2015, the entirety of which is incorporated by reference herein.

FIELD

This application relates generally to a diagnostic system for testing fluid control valves, and more particularly to a position sensor mount for mounting a position sensor to a fluid control valve for such a diagnostic system.

BACKGROUND

Fluid control valves are used in a wide variety of processing systems, such as oil and gas pipelines and processing lines, to control the flow of fluids, including liquids and/or gases, in various lines in many industrial and non-industrial uses. In safety and/or functional critical applications, substantial maintenance is required to assure that the control valve performs properly at all times and thereby reduce losses associated with valves that are not functioning properly. Such maintenance includes both periodic preventative maintenance and repair of malfunctioning valves. Therefore, it is common to diagnostically check such fluid control valves while installed in the processing system so that operational problems can be detected before they become the source of significant under-performance or cause failure of the processing system.

One common diagnostic system for diagnostically testing fluid control valves, such as pneumatically actuated valves, includes providing a pressure sensor to sense varying control pressures at the input of the valve actuator and a position sensor to sense movement of the valve plug. The valve is then operated through a test operation cycle by supplying a controlled variable fluid pressure to the input of the valve actuator. During the test operation cycle, the valve plug is moved through a desired range, normally from a fully opened position to a fully closed position and returned from the fully closed position to the fully opened position. At the same time, the pressure sensor provides an output signal which corresponds to varying pressure at the valve actuator input, and the position sensor provides an output signal corresponding to movement of the valve plug. The respective output signals of air pressure at the actuator and of valve plug or valve stem position are then processed to derive data that may then be used in a variety of ways to diagnose the operational characteristics of the valve and provide operators with an indication of possible repair needs.

The diagnostic system is often used to test a valve that is already installed in the field. In this case, the position sensor is fixedly mounted somewhere to the valve so as to be able to measure movement of either the flow control member itself or to the measure the motion of a component with movement directly correlated with movement of the flow control member, such as a valve stem or actuator stem.

Various methods and apparatus have been used to mount the position sensor to the valve assembly. Often, a mounting assembly for the position sensor is simply improvised in the field using non-standardized arrangements and mechanism. A difficulty with these improvised mounts, however, is that they can take excessive time to plan and/or install, thereby losing precious time, for example, during a maintenance shut-down in an oil refinery. Some mounting assemblies are known that are arranged to mount the position sensor to the yoke of the actuator. However, deflection of the diaphragm casing cannot be obtained with such a mounting assembly. Other mounting assemblies are known that have a mount with a magnetic base, which requires a flat, ferrous surface to attach to. However, many valve designs do not have one or both of these features, and thus the usability of this mounting assembly is severely limited to only certain valves.

One mounting assembly used in the past included a toggle clamp fixed to a base plate used to clamp the base plate to the bolt flange of an actuator housing. However, this mounting assembly was limited in the range of sizes and/or shapes of valve and/or actuator housings that it could be mounted to and also maintain a desired level of stability.

Another mounting assembly used in the past included a pair of adjustable grip pliers used to clamp a base plate directly to the bolt flange of an actuator housing. However, this mounting assembly often provided less than desirable stability for the position sensor.

It is believed that, until now, there has been no standardized method or apparatus for mounting the position sensor to the valve assembly when setting up the valve testing system that provides a standardized, quick, and easy system for attaching the position sensor to nearly any standard type of process control valve so as to be able to obtain a full complement of movement readings from the valve and provide improved stability of the position sensor.

SUMMARY

The present disclosure provides systems, apparatus, and methods that, in some arrangements, may provide a mechanism to quickly, easily, consistently, and sturdily mount a position sensor to many different sizes, shapes, and types of valve assemblies to gather position and/or movement measurements relative to various components of the valve.

According to some aspects of the disclosure, a position sensor mount for a diagnostic system for fluid control valves includes a clamp with an engagement assembly that automatically adjusts to clamp to bolt flanges of different thicknesses and/or provides improved stability of the sensor mount.

According to some aspects of the disclosure, a position sensor mount for a diagnostic system for fluid control valves includes grip pliers that clamp onto bolt flanges of a valve casing, an articulating arm having a first end coupled to the grip pliers and a second end releasably coupled to a sensor bracket for carrying a position sensor, wherein the articulating arm adjusts the sensor bracket in six degrees of freedom.

According to some aspects of the disclosure, a position sensor mount for a diagnostic system for fluid control valves includes grip pliers with jaws that clamp onto bolt flanges of a valve casing, wherein the grip pliers include a guide rail extending downwardly from the jaws, and wherein the rail includes a plurality of mounting holes spaced apart longitudinally along the rail.

According to some aspects of the disclosure, a position sensor mount for a diagnostic system for fluid control valves includes grip pliers that clamp onto bolt flanges of a valve casing, wherein the grip pliers have clamp pads with receivers shaped and sized to receive a bolt head and/or nut.

According to some aspects of the disclosure, a position sensor mount for a diagnostic system for fluid control valves includes grip pliers that clamp onto bolt flanges of a valve casing, and an extension rail releasably fastened to a guide rail of the grip pliers, a plurality of holes through the extension rail spaced apart longitudinally between a first end and a second end of the extension rail, and a sensor bracket that can be releasably fastened at a plurality of locations along the extension rail corresponding with the plurality of holes.

According to some aspects of the disclosure, a position sensor mount for a diagnostic system for fluid control valves includes a channel bracket with first mounting apertures through a web, a strap to clamp the channel bracket to an actuator casing, and a sensor bracket that releasably couples to the channel bracket at any and each of the first mounting holes.

According to some aspects of the disclosure, any one of the position sensor mounts disclosed herein may be mounted to an actuator.

According to some aspects of the disclosure, the position sensor may include a linear transducer and/or a rotary encoder. The position sensor may be one component of a larger diagnostic system for diagnostically testing fluid control valves, such as a diagnostic system that acquires pressure data of various control lines and position data correlated with movement of the flow control member of the valve.

According to some aspects of the disclosure, one or more methods of attaching a position sensor to a fluid control valve includes mounting a position sensor mount according to any one or more of the aspects, arrangements, and/or features disclosed herein to an actuator and/or a fluid control valve.

Any one or more of these aspects may be combined with any one or more of the other aspects and/or additional aspects, arrangements, features, and/or technical effects that are apparent upon detailed inspection of the figures and the following description.

DETAILED DESCRIPTION

Figure 1:
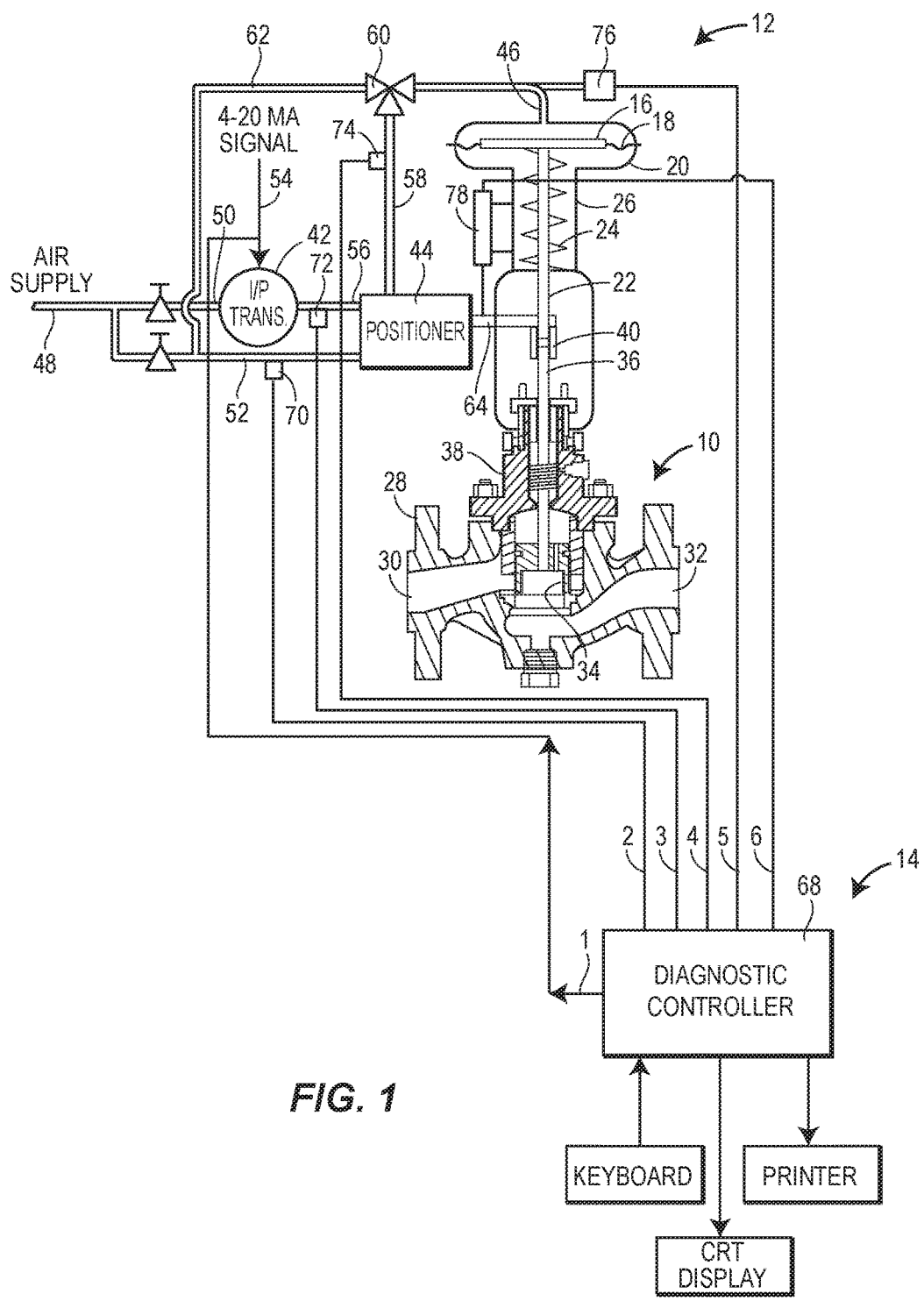
FIG. 1 is a diagrammatic illustration of a diagnostic system for testing fluid control valves.

Before describing the specific examples shown in the drawings, some general aspects, arrangements, and features of the disclosed lever, damper, lever assembly, and/or fluid regulator are provided.

In some arrangements of the disclosure, a position sensor mount for a diagnostic system for fluid control valves includes a base, a toggle clamp, and an engagement assembly. The base has a first clamp jaw and a mount for coupling to a position sensor. The toggle clamp is fixedly attached to the base and has a second clamp jaw that opposes the first clamp jaw. The toggle clamp automatically adjusts to provide a fixed clamping force at different distances between the first clamp jaw the second clamp jaw. The engagement assembly is carried by the second jaw. The engagement assembly includes at least a first clamp pad having a distal end that directly faces the first clamp jaw and swivels relative to the second clamp jaw. The clamp pad may include a swivel joint that allows the clamp pad to swivel. A separating arm may be carried by the second clamp jaw. The separating arm may be coupled to the first clamp jaw with a spindle. The separating arm may extend transverse to the second clamp jaw. The first clamp pad may be carried by the separating arm. A second clamp pad may be carried by the separating arm. The second clamp pad may have a distal end that directly faces the first clamp jaw and swivels relative to the second clamp jaw. The first and second clamp pads may be disposed on opposite lateral sides of the second clamp arm. One or both of the clamp pads may be tilted inwardly at an angle toward the toggle clamp from the second clamp jaw such that a distal end of the clamp pad or pads is parallel with the first clamp jaw when the second clamp jaw is disposed at a non-parallel angle away from the first clamp jaw. The clamp pad may include a soft covering. The first clamp jaw may include a receiver facing the second clamp jaw, wherein the receiver is shaped and sized to receive the end of a bolt therein. The sensor mount, in some arrangements, allows the mount to be clamped to valve or actuator bodies of differing thicknesses without requiring manual adjustment by the operator to satisfactorily mount the position sensor to the valve for obtaining desired position readings. The separating bar may provide a wider clamping area, which may provide improved torsional stability of the diagnostic equipment during testing. The swivel joints allow the clamp pads to make a flat contact against casings of different shapes and widths. The soft covering may protect the surface of the valve and/or actuator from marring from the clamp pads.

In some arrangements of the disclosure, a position sensor mount for a diagnostic system for fluid control valves includes grip pliers, an articulating arm, and a sensor bracket. The grip pliers have first and second jaws that clamp onto bolt flanges of a diaphragm casing. The grip pliers include a guide rail extending downwardly from the gripping jaws. The sensor bracket is shaped and sized to carry a position sensor. The articulating arm has a first end coupled to the guide rail and a second end releasably coupled to the sensor bracket. The articulating arm has a combination of arms and pivot joints arranged to such that the sensor bracket can be adjusted in six degrees of freedom. A plurality of apertures may extend through the guide rail. The apertures may be spaced longitudinally apart from each other along the length of the guide rail. The first end of the articulating arm may have a connector that releasably fastens to each and every one of the apertures separately, whereby the articulating arm can be selectively fastened to the guide rail at any one of the apertures. The sensor bracket may include an elongate plate extending from a first end to a second end, a first aperture through the first end, and second aperture through the second end. A connector at the second end of the articulating arm may releasably fasten to the first aperture. The position sensor may be fastened to the second aperture. The second aperture be an elongate slot.

In some arrangements of the disclosure, a position sensor mount for a diagnostic system for fluid control valves includes grip pliers, an extension rail, and a sensor bracket. The grip pliers may have first and second jaws that clamp onto bolt flanges of a diaphragm casing. The grip pliers may include a guide rail that extends downwardly from the gripping jaws. The sensor bracket may be sized and shaped to carrying a position sensor. The extension rail may extend between a first end and a second end. The first end may be releasably fastened to the guide rail. A plurality of holes may extend through the extension rail spaced apart longitudinally between the first end and the second end. The sensor bracket may be releasably fastened to the extension rail at any one of the plurality of holes rail with a fastener, such as a bolt or pin. Thus, the sensor bracket may be fastened to the extension rail at a plurality of locations along the extension. The sensor bracket may include a guide hole that slidingly receives the extension rail therethrough. The sensor bracket may be able to slide along the extension rail to any one of the plurality of holes through the extension rail. The sensor bracket may include a mounting aperture. The position sensor may be fastened to the sensor bracket at the mounting aperture. The mounting aperture may include an elongate slot. The position sensor may be fastened at each of an infinite number of positions along the elongate slot. The extension rail may be formed of an elongate hollow tube member. The bottom end of the guide rail may fit into the first end of the elongate hollow tube member. At the first end of the extension rail, a pair of aligned bolt holes may extend through first and second opposing sides of the hollow tube member, and/or a pair of slits may extend longitudinally from the first end of third and fourth opposing sides of the hollow tube member. The first end may be releasably fastened to the guide rail with a fastener that extends through the pair of aligned bolt holes and another hole through the bottom end of the guide rail.

In some arrangements, the grip pliers may include one or both of a first clamp pad carried by the first clamp jaw, and a second clamp pad carried by the second clamp jaw. The first clamp pad may have a first clamping surface for engaging against a work piece, and the second clamp pad may have a second clamping surface for engaging against a work piece. Each of the first and second clamping surfaces may be directly facing and opposite each other. The first clamp pad may including a first receiver in the first clamping surface. The second clamp pad may include a second receiver in the second clamping surface. One or both of the first receiver and the second receiver may be shaped and sized to receive a bolt head and/or a nut and/or the distal end of a bolt. One or both of the first and second receivers may be a counter sunk bore.

In some arrangements, a position sensor mount for a diagnostic system for fluid control valves includes a channel bracket, a strap, and a sensor bracket. The channel bracket may have a web and first and second flanges that form a C-section, and first mounting apertures through the web. The strap may be designed to clamp the channel bracket to an actuator casing, for example, a band clamp. The sensor bracket may have a second mounting aperture and a third mounting aperture. The second mounting aperture may be selectively aligned with each of the first mounting apertures and a bolt extending through one of the first mounting apertures and the second mounting aperture may fasten the sensor bracket to the web of the channel bracket. The position sensor may be coupled to the sensor bracket at the third mounting aperture. The sensor bracket may include a flat plate and flange at a first end of the plate and angled relative to the flat plate. The second aperture may extend through the flange. The third aperture may extend through the flat plate. Fourth mounting apertures may extend through one or both of the first and second flanges of the channel bracket. The second mounting aperture may be selectively aligned with each of the fourth mounting apertures. A bolt extending through one of the fourth mounting apertures and the second mounting aperture may fasten the sensor bracket to the flange of the channel bracket.

Any one of the position sensor mounts may be mounted to an actuator for a fluid valve. In addition, any one of the aspects and/or arrangements disclosed herein may further include any one or more of the features described relative to the following example arrangements.

Turning now to the exemplary arrangements of the drawings, FIG. 1 illustrates a fluid control valve 10 and actuator 12 assembly schematically illustrated with a diagnostic system 14 attached thereto to measure various performance characteristics of the valve 10 and/or actuator 12. The valve 10 is a linear valve, and the actuator 12 is a spring to open, flow-down, balanced construction and is one of the more common versions commercially available and used. However, the position sensor mounts of the present disclosure can be used with other types of valves and/or actuators. For example, the positions sensor mounts may be, in some arrangements, used with rotary valves.

The actuator 12 includes a diaphragm plate 16 and a diaphragm 18 disposed inside a diaphragm casing 20, and an actuator stem 22 and a spring 24 disposed inside a spring barrel 26. The valve 10 includes a valve body 28 having a flow path extending from an inlet port 30 to an outlet port 32, and a valve plug 34 connected to a valve stem 36. The valve plug 34 is movably disposed within the valve body 28 to control flow of fluid through the valve body 28 from the inlet port 30 to the outlet port 32. A bonnet 38 connects the spring barrel 26 to the valve body 28, for example with bolts. The valve stem 36 extends out of the valve body 28 through the bonnet 38. A stem connector 40 connects the actuator stem 22 to the valve stem 36. The actuator stem 22 is in turn connected to the diaphragm plate 16, which is mounted within the diaphragm casing 20 by means of the flexible diaphragm 18. The diaphragm casing is formed of two parts, an upper casing 20a and a lower casing 20b, which are bolted together at upper and lower bolt flanges 20c and 20d, as illustrated in more detail hereinafter. The diaphragm is clamped between the upper casing 20a and the lower casing 20b. Movement of the flexible diaphragm 18 in response to pressure changes inside the diaphragm casing 20 control the flow of fluid between the inlet and outlet ports 30, 32 of the valve body 28. The spring 24, which extends downwardly from the diaphragm plate 16 through the diaphragm casing 20, normally biases the diaphragm plate 16 upwardly. The spring 24 normally exerts sufficient pressure upwardly on the diaphragm plate 16 to lift the valve plug 34 and the valve stem 36 assembly so that the valve 10 is in the open position.

Actuation of the valve 10 is provided by standard components including a current-to-pressure ("I/P") transducer 42 and a positioner 44 for supplying a controlled valve operating pressure at a valve actuator input line 46. Such a typical configuration includes a supply of pressurized air on a pneumatic line 48 which is split and fed through respective pneumatic lines through respective valves to the I/P transducer 42 as well as to the valve positioner 44. Thus, the input pneumatic line 50 to the I/P transducer 42 and the input pneumatic line 52 to the valve positioner 44 are each at the pneumatic supply pressure.

In one common arrangement, the signal input for controlling the valve 10 consists of a 4-20 mA signal on transducer input line 54 will provide a corresponding output pressure of about 3-15 psi (0.21-1.06 kscm) on pneumatic line 56 which is supplied to the controlled input of positioner 44. The output pressure of positioner 44 is supplied on line 58 to actuator pressure input line 46 in order to operate the actuator 12 and thus the valve 10. A booster relay 60 may be provided when desired to increase the air volume. The booster relay 60 includes an input of supply line pressure on an input line 62 to aid operation of the actuator 12 by the positioner 44 under certain conditions. The valve positioner 44 also includes a valve positioner arm 64, which is connected at one end to the actuator stem 22 and at the other end within the positioner 44. The valve positioner arm 64 provides valve position registration and thereby ensures that the positioner 44 moves the plug 34 the desired amount in response to changes in the input current to the I/P transducer 42. Under ordinary operations, about a 4 mA control current signal at the input line 54 causes the I/P transducer 42 to provide about a 3 psi (0.21 kscm) input signal to the positioner 44, which in turn provides a corresponding pressure on the actuator input line 46 which is not sufficient to overcome the upward force of the spring 22 and the valve is therefore in the fully opened position. When the control current signal is raised to about 20 mA, the I/P transducer 42 provides about 15 psi (1.06 kscm) to the positioner 44, which in turn provides a corresponding pressure input at line 46, which counteracts the spring 24 and thereby slides the valve stem 36 downwardly so as to seat the valve plug 34 and thereby close the valve 10. Various valve positions in between the fully opened and fully closed position are obtained by variations in the input 4-20 mA current signal to the I/P transducer 42.

The diagnostic system 14 includes a diagnostic controller 68 connected to pressure sensors 70, 72, 74, and 76, and a position sensor 78, by channels 2, 3, 4, 5, and 6, respectively, and a channel 1 connecting the diagnostic controller 68 to the I/P transducer 42. The diagnostic controller 68 provides a 0-30 mA signal output on channel 1 in a pre-programmed change form to stroke or operate the valve plug 34 over a predetermined range and thereby provide respective sensor output signals on channels 2, 3, 4, 5, 6 to diagnostic controller 68. Information to be entered into the controller 68 can be provided by any known mechanism, such as a keyboard, and output information from the controller 68 can be displayed by any various known mechanisms, such as a CRT display and/or a printer.

In order to provide diagnostic evaluation of the valve 10 in terms of various well known valve characteristics, a suitable output signal from the diagnostic controller 68 is provided on the current signal output channel 1 to the I/P transducer 42. As an example, a 0 to 30 mA signal on channel 1 may be sufficient to ensure that the valve plug 34 is stroked through its fully opened and fully closed positions. Less than the full range of valve operation may also be provided. The pressure sensors 70, 72, 74 and 76 are temporarily mounted to sense the pneumatic pressure on the illustrated respective pneumatic lines and to provide an electric output signal on respective input channels 2, 3, 4 and 5 to the diagnostic controller 68. Such pressure sensors are well known, commercially available items.

The position sensor 78 is suitably temporarily removably mounted to the valve assembly with one of the position sensor mounts disclosed herein to detect the movement of a component of the valve 10 and/or the actuator 12 that corresponds to or can be directly correlated to movement of the valve plug 34 between the open and closed positions. In this example, the position sensor 78 is mounted to the spring barrel 26 in a position and manner sufficient to sense linear positional movement of the valve positioner arm 64, which corresponds to movement of the valve plug 34 between the open and closed positions. The position sensor 78 provides a corresponding electric output signal which is supplied to channel 6 of the controller 68. The position sensor 78 may a commercially available device, such as a digital linear gauge, manufactured by Nititoyo Company of Japan, utilizing a light source and an etched glass light sensor to provide a signal on channel 6 in response to linear movement of the valve plug 34. In other arrangements, the position sensor 78 may be a linear transducer that is capable of sensing the position of one or more components of the valve assembly. In still other applications, the position sensor 78 may be a rotary encoder, in particular when the diagnostic system is used on a rotary valve rather than a linear valve. Of course, other types of position sensors 78 may be used depending on the particular valve and/or the application being tested. As the valve 10 is stroked through its test operating cycle by means of the control current signal on channel 1, a respective pressure is sensed and the corresponding electric signals are fed to channels 2, 3, 4 and 5, and simultaneously the position and travel distance of the valve plug 34 is sensed and the corresponding electric signal is supplied on channel 6. Thereafter, the data regarding pressure and position of the valve plug may be correlated, compared, and processed in any of many various ways to diagnose whether the valve is functioning as desired.

For proper functioning of the diagnostic system 14, it is generally important to maintain the position sensor 78 in a fixed position relative to the bodies of the actuator 12 and/or the valve 10. In addition, because the diagnostic system 14 may be readily adapted to test many different types, shapes, and sizes of valves and/or actuators, it is also helpful if mount for the position sensor 78 be able to adjust to stably mount the position sensor 78 on many different shapes and sizes of valve bodies and/or actuator bodies. Various position sensor mounts for mounting the position sensor 78 to a valve assembly, such as to the actuator 12, are described in particular detail hereinafter.

Figure 2:
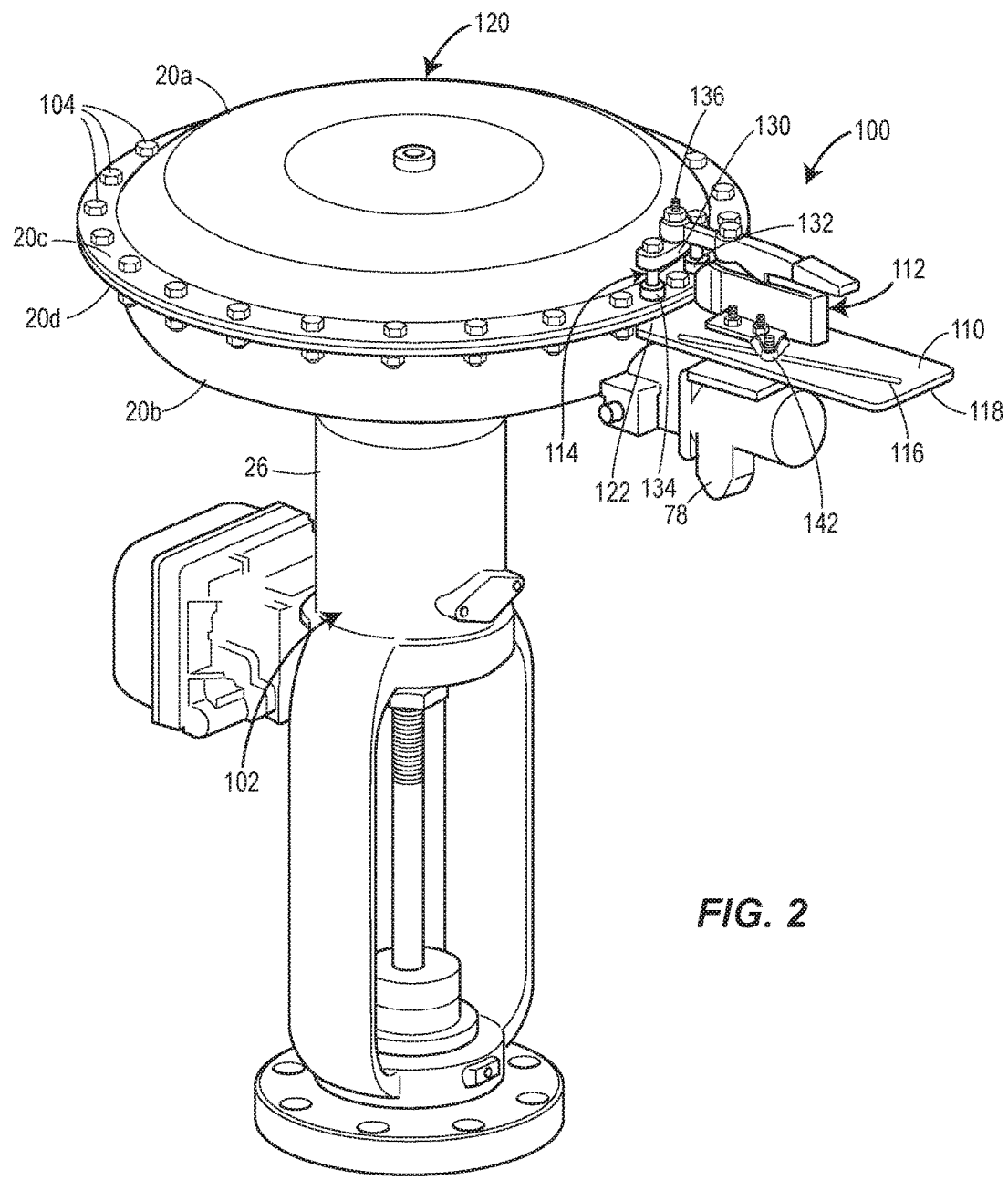
FIG. 2 illustrates a position sensor mount for a diagnostic system for fluid control valves according to a first arrangement mounted to an actuator body.

FIG. 2 illustrates a first position sensor mount 100 mounting the position sensor 78 to an actuator 102. The actuator 102 is a linear spring and diaphragm-type actuator, including a diaphragm casing 20 coupled to the top end of a spring barrel 26. A diaphragm 18 (not visible) is disposed inside the diaphragm casing 20, and a spring 24 (not visible) is disposed inside the spring barrel 26, generally similar to the actuator 12 described previously for purposes of this disclosure. The diaphragm casing 20 is made of two parts, an upper casing 20a and a lower casing 20b. The upper casing 20a has a bolt flange 20c, and the lower casing 20b has a lower bolt flange 20d. Each bolt flange 20c and 20d extends around the outer perimeter of the respective upper or lower casing 20a, 20b. The bolt flanges 20c, 20d face each other, and bolts 104 extend through corresponding bolt holes through the bolt flanges 20c and 20d to clamp the bolt flanges, and thereby the upper and lower casings 20*a*, 20*b*, together to form the diaphragm casing 20. The diaphragm 18 is clamped between the bolt flanges 20*c* and 20*d* and divides the interior of the diaphragm casing into a first chamber, which may be a control pressure chamber, and a second chamber, which may be a spring chamber.

Figure 3:
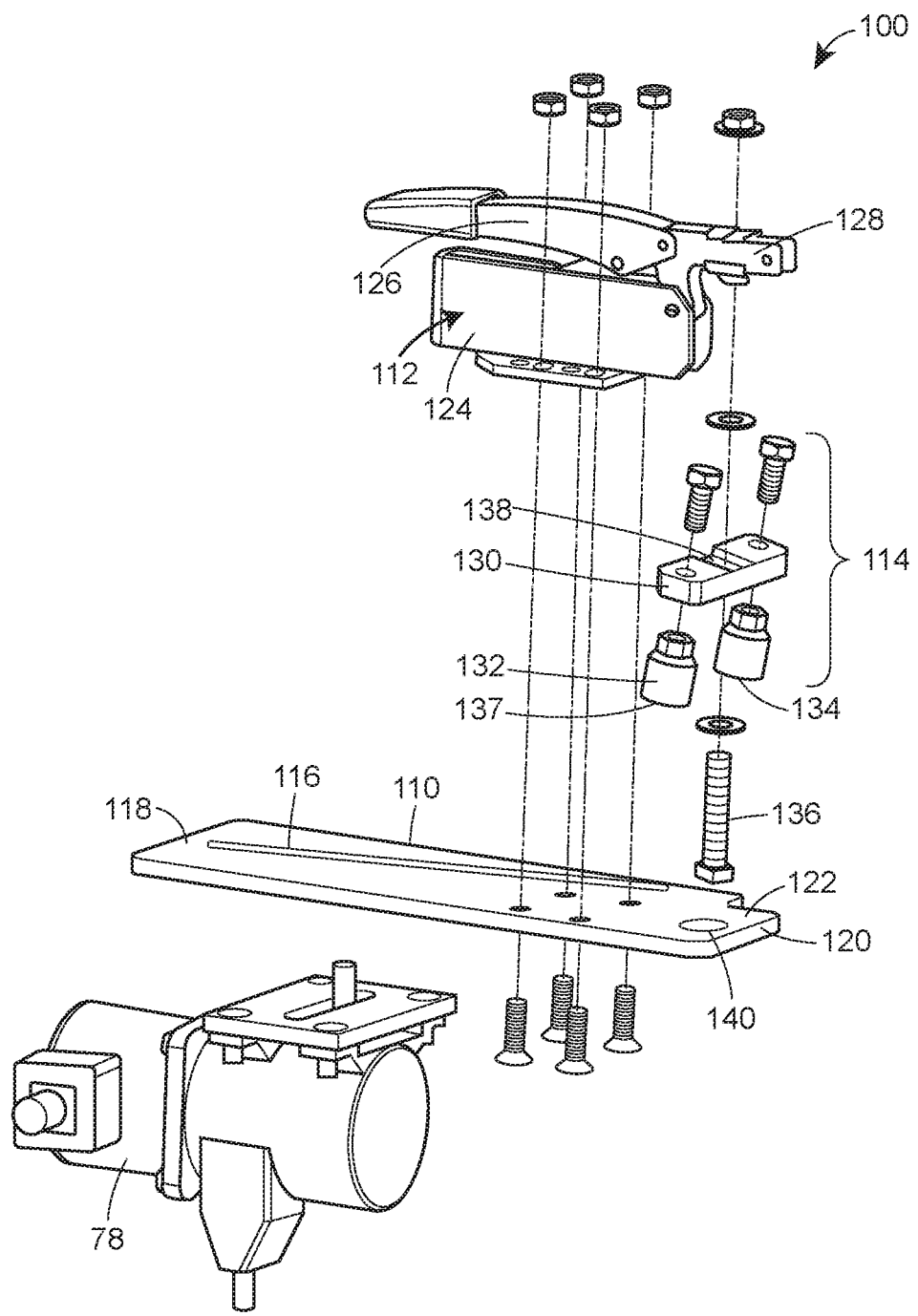
FIG. 3 is an exploded perspective view of the position sensor mount of FIG. 2.

With reference to both FIGS. 2 and 3, the sensor mount 100 includes a base 110, a toggle clamp 112, and an engagement assembly 114 that automatically adjusts to clamp onto bolt flanges 20*d*, 20*d* of different thicknesses and/or provides improved stability of the sensor mount 100. The sensor mount 100 is arranged to clamp to the bolt flanges 20*c*, 20*d* such that the position sensor 78 is mounted in a stable, fixed position relative to the diaphragm casing 20. In this example, the position sensor 78 is a linear transducer. However, other types of position sensors may be used, depending on the type of valve and actuator being tested and/or other considerations.

The base 110 includes a mount 116 for fixedly coupling the position sensor 78 to the base 110. The base 110 is in the form of a flat plate, for example a length of steel bar. The mount 116 is in the form of a slot through the plate extending from a first end 118 toward a second end 120 of the base 110. A first clamp jaw 122 is formed at the second end 120 of the base. The mount 116 in the form of a slot extends at an angle to a longitudinal axis of the base 110 from a first end adjacent the first end 118 of the plate to a second end on a lateral side of the toggle clamp 112.

The toggle clamp 112 is secured to the base 110, for example, with bolts, screws, and/or welds, at a location intermediate the first clamp jaw 122 and the first end 118. The toggle clamp 112 includes a main body 124, a handle linkage 126, and a second clamp jaw 128. The second clamp jaw 128 faces the first clamp jaw 122. Each of the handle linkage 126 and the second clamp jaw 128 is pivotably coupled to the main body 124, and the handle linkage 126 is pivotably coupled to the second clamp jaw 128, such that pivoting the handle linkage 126 moves the second clamp jaw 128 toward and/or away from the first clamp jaw 122 to clamp and/or release an object between the first and second clamp jaws 122, 128. Preferably handle linkage 126 automatically adjusts to provide a fixed clamping force against different thickness work pieces (such as different thickness bolt flanges 20*c*, 20*d*) when the handle linkage 126 is fully depressed, as shown in the drawings. Thus, although different work pieces will cause the distances between the first clamp jaw 122 and the second clamp jaw 128 to be different in the fully depressed position, the clamping force generated by the clamp jaws 122, 128 against the work piece therebetween will be the same pre-selected force. The handle linkage 126 pivots back and forth between a fully clamped position, in which the handle linkage 126 is fully depressed toward the main body 112 and the second clamp jaw 128 is pivoted closest to the first clamp jaw 122, and a fully open position, in which the handle linkage 126 is pivoted away from the main body 112 and the second clamp jaw 128 is pivoted furthest away from the first clamp jaw 122. One possible toggle clamp 112 is the auto-adjust toggle clamp, horizontal, sold by Bessey Tools North America. However, other types of toggle clamps may be used that provide the same functionalities described herein.

The engagement assembly 114 includes a separating arm 130, a first clamp pad 132, a second clamp pad 134, and a spindle 136. The spindle 136 rigidly fastens the separating arm 130 to the second clamp jaw 128. The spindle 136 may have the form of a bolt that is coupled to the second clamp jaw 128 with a nut or other similar fastener arrangements. The separating arm 130 may be an elongate flat or bracket extending transversely to the second clamp jaw 128 from a first end disposed on one lateral side of the second clamp jaw 128 to a second end disposed on the opposite lateral side of the second clamp jaw 128. A proximal end of the first clamp pad 132 is fastened to the first end of the separating arm 130, and a proximal end of the second clamp pad 134 is fastened to the second end of the separating arm, for example with bolts or screws. Each of the first and second clamp pads 132, 134 extends downwardly toward the first clamp jaw 122 such that a distal end 137 of each clamp pad 132, 134 directly faces the first clamp jaw 122. In this manner, the distal ends 137 of the clamp pads 132, 134 can engage and squeeze against the first clamp jaw 122 or a work piece, such as the bolt flanges 20*c*, 20*d*, when the handle linkage 126 is in a fully clamped position.

The clamp pads 132 and 134 are disposed on opposite lateral sides of the second clamp jaw 128. Thus, the first clamp pad 132 is disposed on a first lateral side of the clamp jaw 128, and the second clamp pad 134 is disposed on a second lateral side of the clamp jaw 128. This arrangement provides increased stability, in particular providing increased resistance against torsion and twisting of the sensor mount 100 and the position sensor 78, for example when clamped onto the bolt flanges 20*c*, 20*d* as shown in FIG. 2, with the bolt flanges 20*c*, 20*d* clamped between the first clamp jaw 122 and the second clamp jaw 128.

Each of the first and second clamp pads 132, 134 swivels relative to the second clamp jaw 128 so that the clamp pads can automatically adjust to fully engage, e.g., to lay flat against, surfaces that are not exactly level, and/or can adjust to fully engage, e.g., to lay flat against, bolt flanges 20*c*, 20*d* of varying thickness. Each clamp pad 132, 134 includes a swivel joint, such as a ball and socket joint, between the proximal end and the distal end 137 of the clamp pad, which allows the distal end 137 to swivel.

Optionally, at least the distal ends 137, and optionally more, of each clamp pad 132, 134 is coated with a coating that prevents the clamp pads from marring the surface of the diaphragm casing 20, such as by scratching or gouging. Preferably, the coating is a relatively soft coating. For example, the distal ends 137 may have an outer coating of rubber, silicon rubber, plastic, cloth, felt, cork, or similar materials that would prevent the clamp pads from marring the polished surfaces of the bolt flanges 20*c* or 20*d* when clamped thereto as shown in FIG. 2.

Each of the first and second clamp pads 132, 134 is optionally tilted or angled inwardly toward the main body 124 of the toggle clamp 112 so that the distal ends 137 will lay flat against the surface of the bolt flange 20*c* for thicker bolt flanges 20*c*, 20*d*. In other words, each of the clamp pads 132, 134 may be tilted inwardly at an angle toward the toggle clamp from the second clamp jaw 128 such that the distal end 137 of the clamp pad is parallel with the first clamp jaw 122 when the second clamp jaw 128 is disposed at a non-parallel angle away from the first clamp jaw. In this arrangement, the axis of each clamp pad 132, 134 (as defined by the axis of the fastener bolts), is tilted back toward the main body 124 an angle of between about 1 degrees and 20 degrees, and more preferably an angle between about 10 degrees and 15 degrees, from a perpendicular axis extending downwardly from the second clamp jaw 128 (as defined by the axis of the spindle 136 in this example) such that the distal ends 137 are closer to the main body 124 than the proximal ends of the clamp pads 132, 134. In this example, the separating arm 130 has an engagement surface 138 that seats against the bottom surface of the second clamp jaw 128, in which the engagement surface 138 is beveled or angled the desired angle (as explained above) relative to the bottom surface of the separating arm 130 against which the proximal ends of the clamp pads 132, 134 are seated. This provides an easy to produce and assemble assembly that tilts the clamp pads 132, 134 the desired amount. However, other arrangements for angling the distal ends 137 of the clamp pads 132, 134 back toward main body 124 of the toggle clamp 112 are also possible.

The first clamp jaw 122 includes a receiver 140 disposed directly below the second clamp jaw 128 and laterally between the first and second clamp pads 132, 134 for receiving a bolt head, nut, and/or bolt end therein. When clamped to the bolt flanges 20c, 20d of the diaphragm casing 20 as shown in FIG. 2, a bolt head (or nut) fits into the receiver 140 so that the top surface of the first clamp jaw 122 seats flat against the surface of the bolt flange 20d, which provides a wider lateral clamping surface to improve lateral torsional stability of the sensor mount 100. At the same time, the first and second clamp pads 132, 134 clamp on opposite lateral sides of the same bolt on the flat surface of the bolt flange 20c with the separating arm 130 spaced above the top end of the bolt, which also provides a wider lateral clamping arm to improve lateral torsional stability of the sensor mount 100. In this example, the receiver 140 is in the form of an aperture through the base 110. However, in other arrangements, the receiver 140 may have the form of a blind bore recessed into the top surface of the first clamp jaw 122. The inner edge of the receiver 140 also helps prevent the sensor mount 100 from pulling radially off of or moving laterally along the bolt flanges 20c, 20d by engaging against the side surface of the bolt head or nut.

When the sensor mount 100 is clamped to the bolt flanges 20c, 20d as shown in FIG. 2, the position sensor 78 is mounted to the base 110 by a bolt or pin that extends upwardly through the mount 116. When the mount 116 is in the form of an elongate slot, as in FIGS. 2 and 3, the position sensor 78 may be selectively secured at any desired location along the slot, for example, with a locking nut 142, such as a wing nut. In this manner, the location of the position sensor 78 can be easily adjusted toward and/or away from the spring barrel 26 to be in a necessary sensing position on may sizes and shapes of actuators.

The sensor mount 100 may be easily and quickly attached to a valve assembly to provide a stable mount for the position sensor 78, for example, during set up and use of the diagnostic system 14. In particular, the sensor mount 100 requires less time to set up and attaché because it is provided as a single assembly. In addition, the sensor mount 100 may reduce the amount of time required to set up the diagnostic system 14 and provide a more standardized mount for the position sensor 78.

Figure 4:
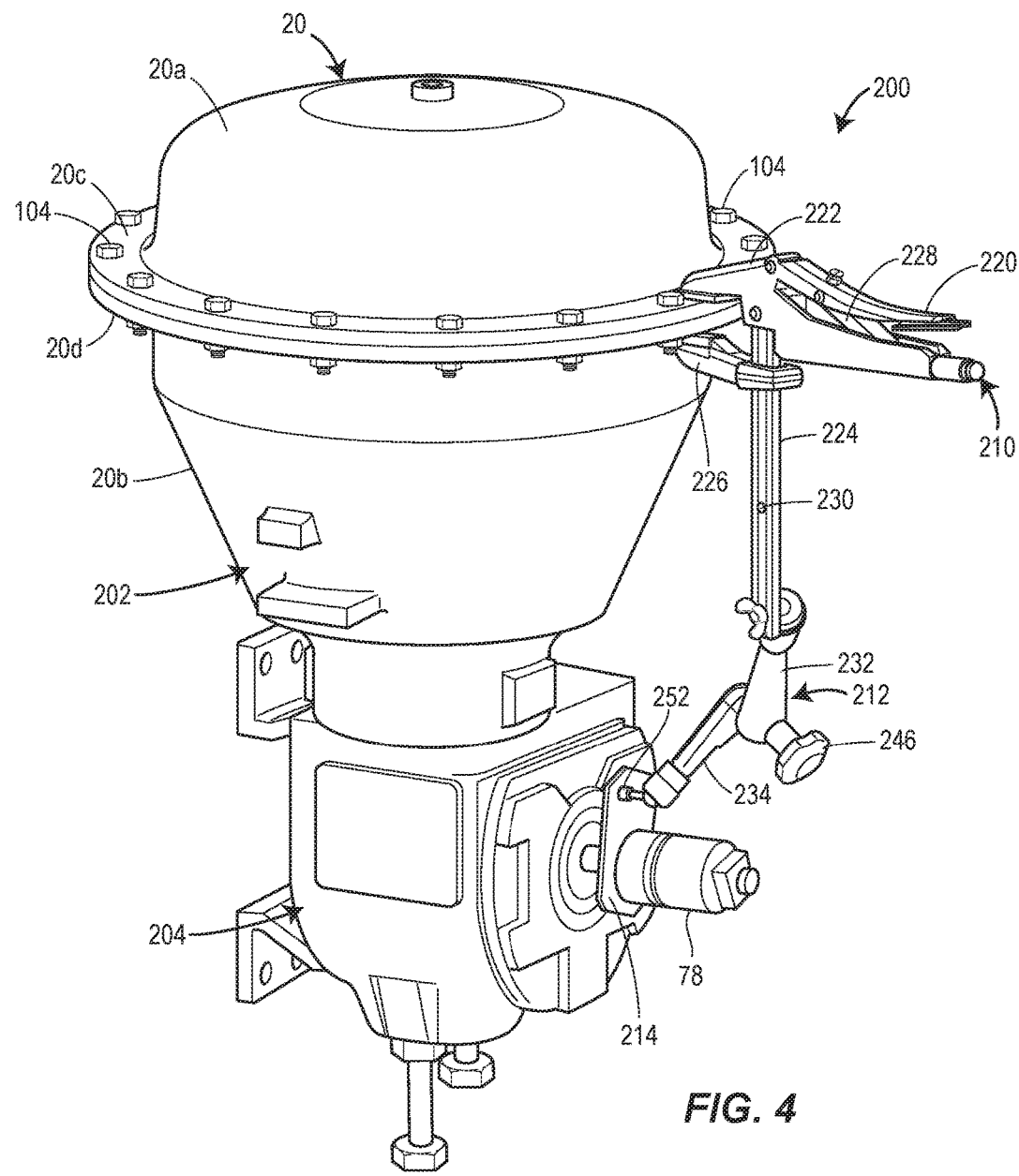
FIG. 4 illustrates a position sensor mount for a diagnostic system for fluid control valves according to a second arrangement mounted to an actuator body.
Figure 5:
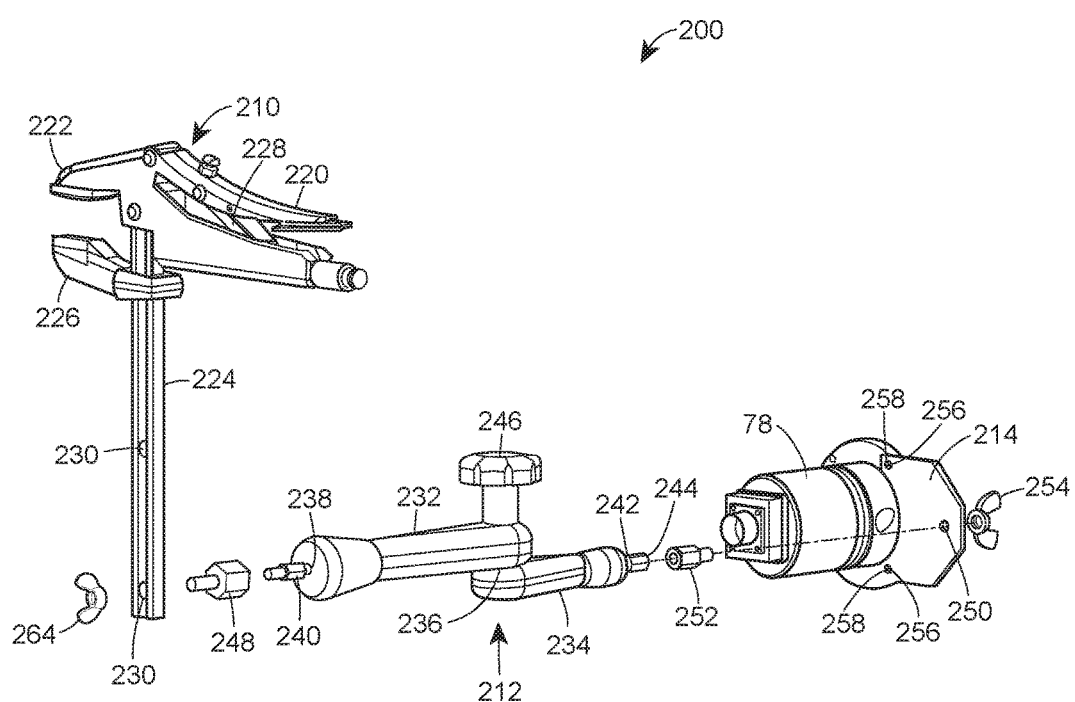
FIG. 5 is an exploded perspective view of the position sensor mount of FIG. 4.

Turning now to FIGS. 4 and 5, another position sensor mount 200 is illustrated. FIG. 4 illustrates the sensor mount 200 in one possible position mounting the position sensor 78 to an actuator 202. The actuator 202 is a rotary, spring and diaphragm-type actuator. Although the actuator 202 has a different size, shape, and arrangement than the actuator 102, many relevant components are functionally similar for purposes of this disclosure, and the following description uses the same reference signs for such similar components where possible. Thus, the actuator 202 also includes an diaphragm casing 20 coupled to the top end of a lever housing 204, which houses a lever and rotary stem (not visible). A diaphragm 18 (not visible) and a spring 24 are disposed inside the diaphragm casing 20. The diaphragm casing 20 is made of two parts, an upper casing 20a and a lower casing 20b. The upper casing 20a has an upper bolt flange 20c, and the lower casing 20b has a lower bolt flange 20d, each bolt flange 20c, 20d extending around the outer perimeter of the respective upper or lower casing. The bolt flanges 20c, 20d face each other, and bolts 104 extend through corresponding bolt holes through the bolt flanges 20c and 20d to clamp the bolt flanges, and thereby the upper and lower casings 20a, 20b, together to form the diaphragm casing 20. The diaphragm 18 is clamped between the bolt flanges 20c and 20d and divides the interior of the diaphragm casing into a first chamber, which may be a control pressure chamber, and a second chamber, which may be a spring chamber.

With reference to both FIGS. 4 and 5, the sensor mount 200 at a general level includes grip pliers 210, an articulating arm 212, and a sensor bracket 214. The sensor mount 200 is arranged to clamp to the bolt flanges 20c, 20d, when bolted together, such that the position sensor 78 is mounted in a stable, fixed position relative to the diaphragm casing 20. In this example, the position sensor 78 is a rotary encoder. However, other types of position sensor may be used, depending on the type of valve and actuator being tested and/or other considerations.

The grip pliers 210 clamp fixedly to the upper and lower bolt flanges 20c, 20d and can be adjusted to clamp to different bolt flanges having a wide range of different thicknesses. One end of the articulating arm 212 is attached to the grip pliers 210, and the other end of the articulating arm is attached to the sensor bracket 214. The position sensor 78 is attached to the sensor bracket 214. The articulating arm 212 can be adjusted in at least three, and preferably six degrees of freedom, including X, Y, and Z translational positions and pitch, roll, and yaw orientations. Thus, the sensor bracket 214 and the position sensor 78 can be moved into any position and orientation within a three-dimensional radius relative to the attachment point to the guide rail 224. In addition, the articulating arm 212 can be locked at any of the positions with a lock 246, thereby allowing the sensor bracket 214 and the position sensor 78 to be adjusted and locked into a necessary position for sensing movement of, for example, the rotary stem, as illustrated in FIG. 4.

More specifically, the grip pliers 210 may be a modified version of a known grip pliers, such as the Supergrips™ grip pliers sold by Bessey Tools North America. The grip pliers 210 include a handle 220, an upper jaw 222 formed as an extension of the handle 220, a guide rail 224 extending downwardly from the handle 220, a lower jaw 226 carried by the guide rail 224, and a clamp linkage 228, all aligned along a single plane. The lower jaw 226 can slide up and down the guide rail 224 and can be selectively locked into any one of an infinite number of positions between the top end at the handle 220 and the distal end at the bottom. The clamp linkage 228 exerts a clamping force on the upper and lower jaws 222, 226, which clamping force may be selectively varied by a user according to known methods. The grip pliers 210 are modified from the known grip pliers to have one or more apertures, such as holes 230, through the guide rail 224. The holes 230 are spaced apart longitudinally along the guide rail 224, and are preferably aligned with their axes parallel to each other, and preferably perpendicular to the plane of the handle 220. However, the holes 230 could have different alignments. One of the holes 230 is preferably located at the bottom end of the guide rail 224.

The articulating arm 212 includes at least two individual arms 232 and 234 pivotably connected to each other such that an object at a distal end of the arm 232 can be selectively positioned and locked in any position within a three-dimensional radius from an object at the distal end 234 of the arm. In this example, the articulating arm 212 includes a two-dimensional pivot joint 236 connecting adjacent proximal ends of the arms 232 and 234, a first three-dimensional pivot joint 238 connecting a first connector 240 to the distal end of the first arm 232, and a second three-dimensional pivot joint 242 connecting a second connector 244 to the distal end of the second arm 234. The two-dimensional pivot joint is a pin-and-bore joint, and the three-dimensional pivot joints are ball-and-socket joints. However, other joint arrangements may be used. A lock 246 is arranged to selectively lock, such as by clamping and/or tensioning, and unlock the joints 236, 238, and 242 in any selected orientation with a single actuation motion. In this example, the lock 246 is locked and/or unlocked by rotating the hand knob. The articulating arm 212 is fastened to the grip pliers 210 by connecting the first connector 240 to the guide rail 224 at any one of the holes 230, for example with an adapter 248 that fastens to the connector 240 and extends through the hole 230 and is fastened in the hole with a nut 264 or other fastening mechanism. In this way, the distal end of the first arm 232 can be connected to the guide rail 224 at any one of the holes 230, which allows the position of the articulating arm 212 relative to the grip pliers 210 to be easily adjusted to accommodate valves and/or actuators of different sizes and shapes. One acceptable type of articulating arm 212 is the Fisso articulating arm and accompanying accessories sold by Baitella AG. However, the articulating arm 212 is not limited to this particular exemplary arrangement, and other arrangements and/or types suitable for providing the desired three-dimensional adjustability are also acceptable.

The sensor bracket 214 includes at least a first aperture 250, such as a hole or elongate slot, for connecting to the distal end of the second arm 234. In this example, the connector 244 is fastened to the sensor bracket 214 with a second adapter 252 that couples to the connector 244 and has a threaded end that fits through the aperture 250 onto which a nut 254 is threaded. However, the adaptors 248 and 252 may not be necessary, depending on the arrangement of the connector 240 and/or the holes 230 and/or 250. The sensor bracket 214 also includes one or more, and preferably at least two additional apertures 256 for coupling to the position sensor 78. The sensor bracket 214 is in the form of a flat, elongate plate extending between opposite first and second ends. The aperture 250 is disposed through the first end, and the apertures 256 are disposed through the second end. The position sensor 78 is fastened to the sensor bracket 214 with one or more fasteners 258, such as bolts or screws, disposed through and fastened in the apertures 256. However, other forms and locations may also be suitable depending on the specific geometries of the various components.

To mount the position sensor 78 to the actuator 202, the grip pliers 210 are clamped to the bolt flanges 20c, 20d. The connector 240 of the adapter 248 of the articulating arm 212 is fastened to a selected hole 230 along the guide rail 224. The sensor bracket 214 is fastened to the connector 244 or the adapter 252. The position sensor 78 is fastened to the apertures 256. The articulating arm 212 is adjusted to located the position sensor adjacent to the rotary stem to sense the movement of the rotary stem, and then is locked into the selected position with the lock 246.

Figure 6:
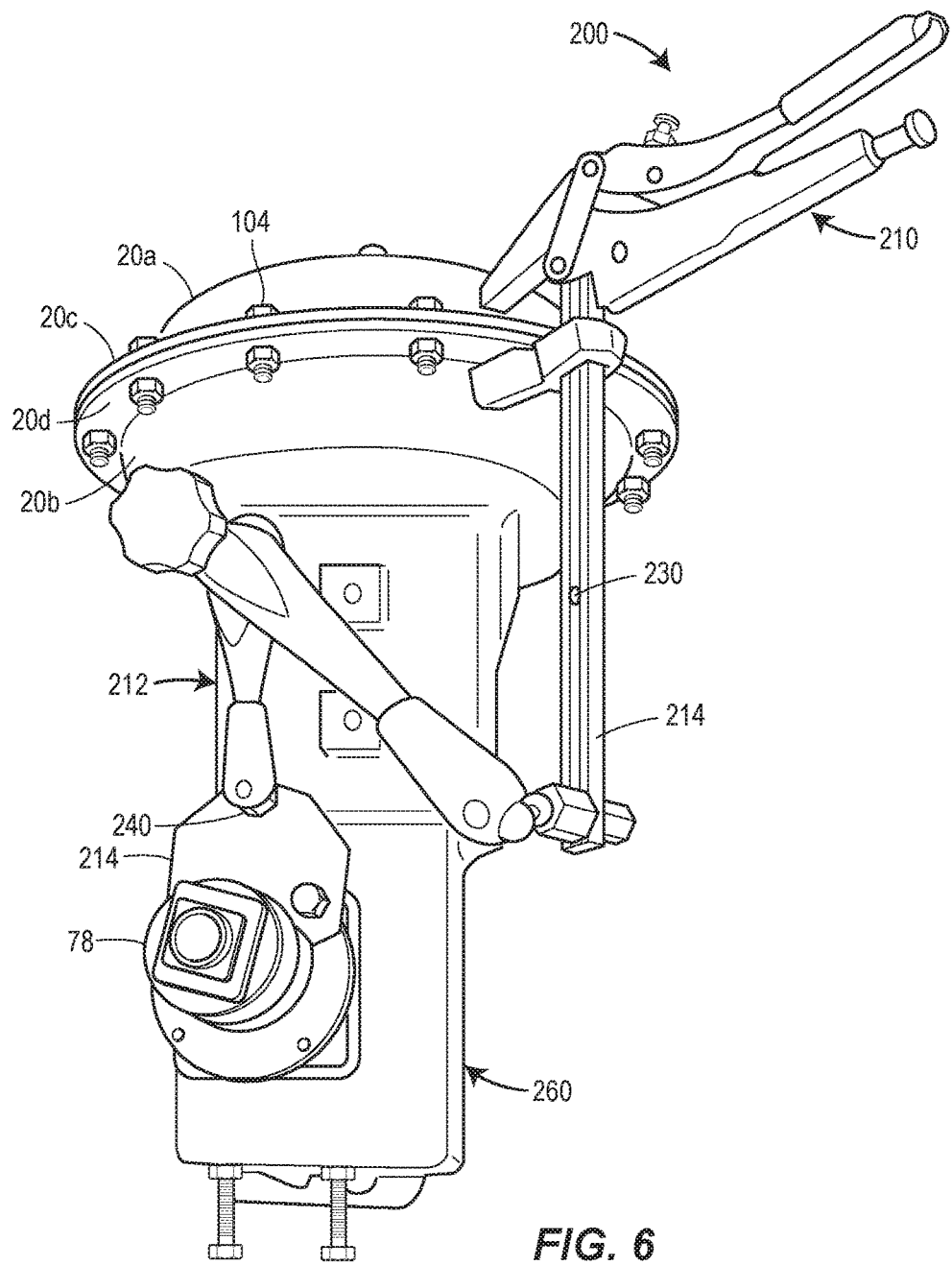
FIG. 6 is a perspective view of the position sensor mount of FIG. 4 mounted to another actuator body.

FIG. 6 illustrates the position sensor mount 200 mounted to an actuator 260 that has a different size and shape than the actuator 202. In this example, the actuator 260 is a diaphragm-and-spring type rotary actuator. Although the actuator 260 has a different size, shape, and arrangement than the actuator 202, many relevant components are functionally similar, and the following description uses the same reference signs for such similar components where possible. The grip pliers 210 are clamped to the upper and lower bolt flanges 20c, 20d, preferably between two adjacent bolts 104. The articulating arm 212 is connected to the guide rail 224 at the lower-most (i.e., most distal from the handle 22) hole 230. The sensor bracket 214 is fastened to the connector 240 at the aperture 250. The position sensor 78, which in this case is a rotary encoder, is fastened to the sensor bracket 214 at the apertures 256. The arms 232, 234 are adjusted such that the position sensor 78 is directly adjacent to the end of the rotary stem so that the position sensor 78 can sense the position of the rotary stem, and by correlation therewith, the position of a valve plug or other flow control member coupled to the rotary stem.

Figure 7:
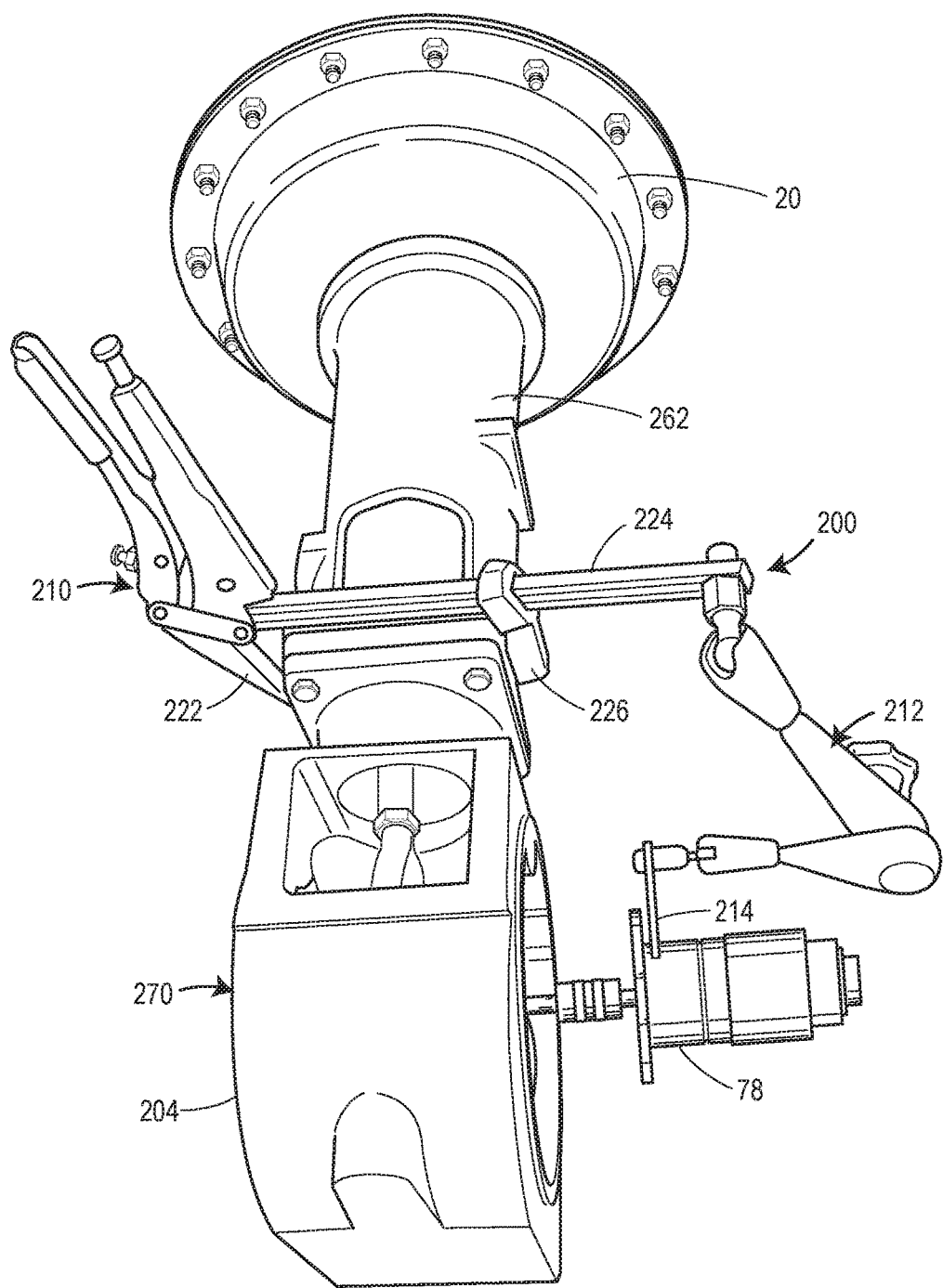
FIG. 7 is a perspective view of the position sensor mount of FIG. 4 mounted to yet another actuator body.

FIG. 7, illustrates the position sensor mount 200 mounted to an actuator 270 that has a different size and shape than the actuator 202 or the actuator 260. Although the actuator 260 has a different size, shape, and arrangement than the actuators 202 and 260, many relevant components are functionally similar, and the following description uses the same reference signs for such similar components where possible. In this example, the actuator 270 is a diaphragm-and-spring type rotary actuator with an elongated spring and/or actuator stem casing 262 extending between the diaphragm casing 20 and the lever housing 204. Here, the grip pliers 210 are clamped onto and around the stem casing 262 rather than to the bolt flanges of the diaphragm casing 20. The articulating arm 212 and the sensor bracket 214 are adjusted to position the position sensor 78 directly adjacent to the end of the rotary stem so that the position sensor can sense the position of the rotary stem, and by correlation therewith, the position of a valve plug or other flow control member coupled to the rotary stem.

As can be seen from the illustrations in FIGS. 4, 6, and 7, the position sensor mount 200 provides an extremely versatile and easily used mechanism for mounting the position sensor 78 to many different and varied types, sizes, and shapes of actuators and/or valves. Further, although the examples all illustrate the position sensor mount 200 mounted to actuators for rotary valves, the position sensor mount 200 could also be used to mount an appropriate position sensor 78 to a linear valve and/or actuator. Further, by providing a standardized assembly, position sensor mount 200 can be easier and quicker to use in the field and provide more consistent mounting than the improvised mounting systems of the past.

Figure 8:
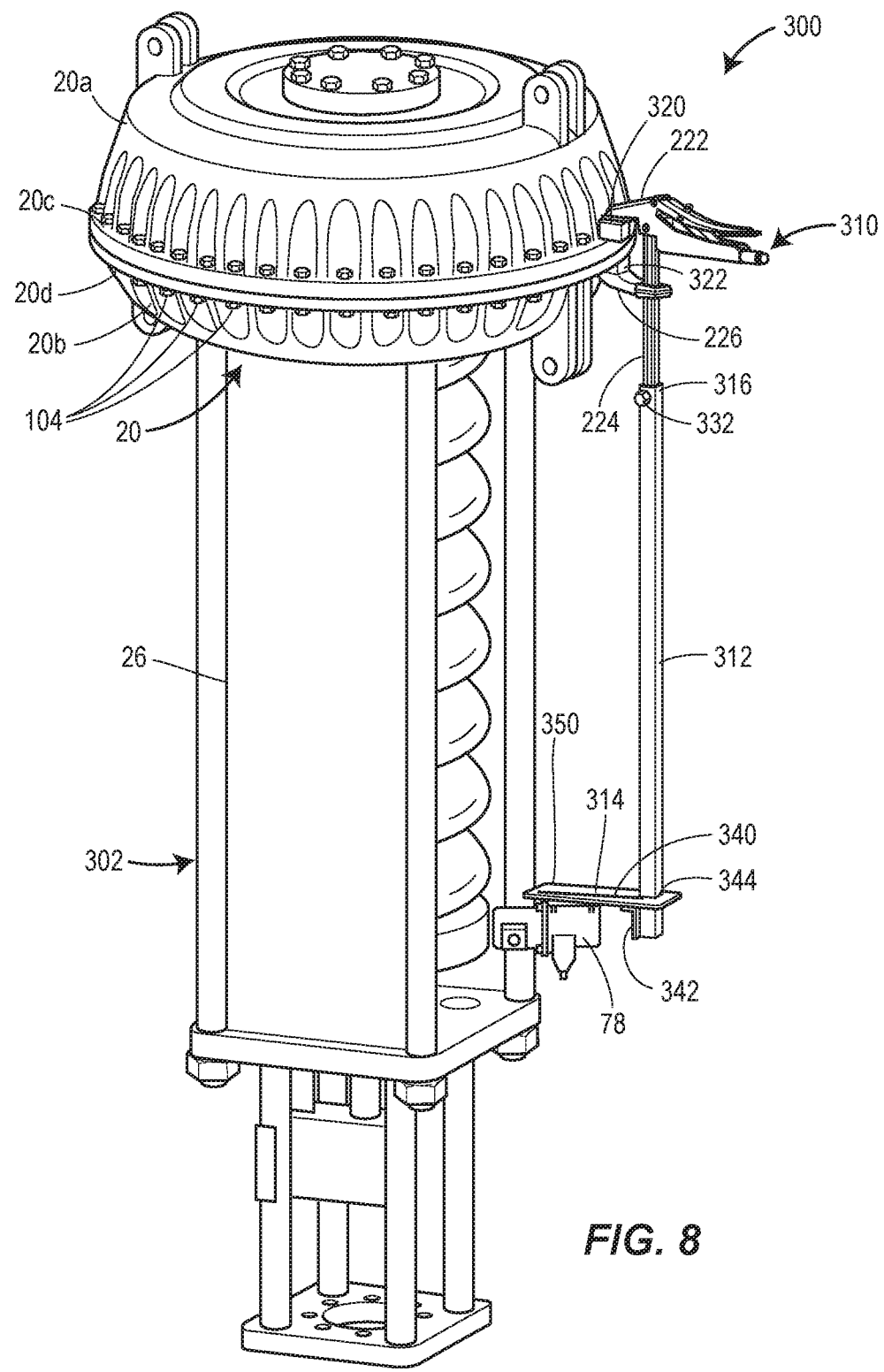
FIG. 8 illustrates a position sensor mount for a diagnostic system for fluid control valves according to a third arrangement mounted to an actuator body.

Turning now to FIGS. 8-11, another position sensor mount 300 is illustrated. FIG. 8 illustrates the sensor mount 300 in one possible position mounting the position sensor 78 to an actuator 302. The actuator 302 is a linear, spring-and-diaphragm type actuator. Although the actuator 302 has a different size, shape, and arrangement, the actuator 302 is functionally similar to the actuator 12 and 102 for purposes of this disclosure, and the following description uses the same reference signs for such similar components where possible. Thus, the actuator 302 also includes a spring barrel 26 extending downwardly from the bottom side of a diaphragm casing 20. A diaphragm 18 (not visible) is disposed inside the diaphragm casing 20. A spring 24 is disposed inside the spring barrel 26. The diaphragm casing 20 is made of two parts, an upper casing 20a and a lower casing 20b. The upper casing 20a has an upper bolt flange 20c, and the lower casing 20b has a lower bolt flange 20d, each bolt flange 20c, 20d extending around the outer perimeter of the respective upper or lower casing. The bolt flanges 20c, 20d face each other, and bolts 104 extend through corresponding bolt holes through the bolt flanges 20*c* and 20*d* to clamp the bolt flanges, and thereby the upper and lower casings 20*a*, 20*b*, together to form the diaphragm casing 20. The diaphragm 18 is clamped between the bolt flanges 20*c* and 20*d* and divides the interior of the diaphragm casing into a first chamber, which may be a control pressure chamber, and a second chamber, which may be a spring chamber. Additional features of the actuator 302 are well known and/or previously described and need not be set forth in detail herein.

Figure 9:
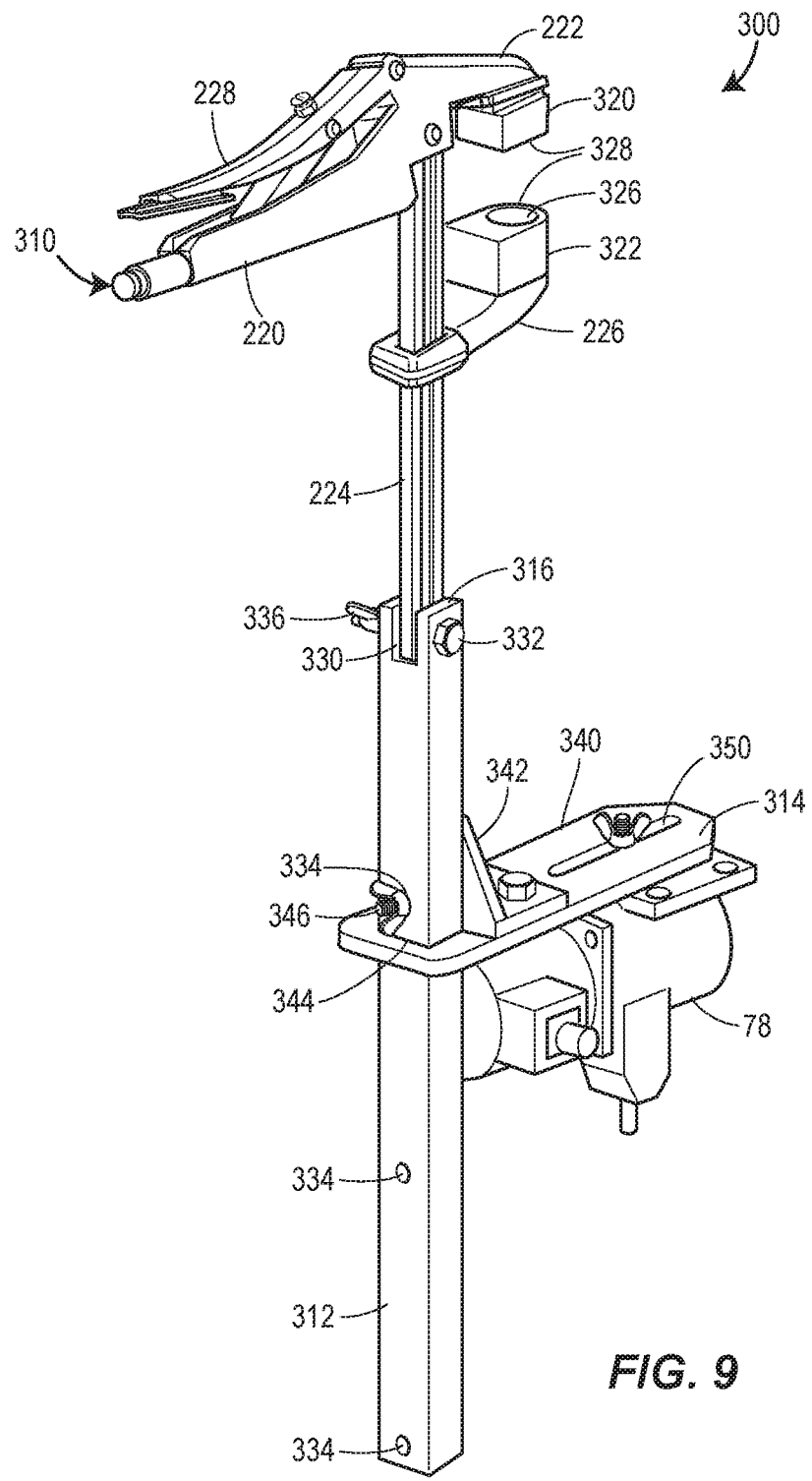
FIG. 9 is a perspective view of the position sensor mount of FIG. 8.

With reference to both FIGS. 8 and 9, the sensor mount 300 at a general level includes grip pliers 310, an extension rail 312, and a sensor bracket 314. The sensor mount 300 is arranged to clamp to the bolt flanges 20*c*, 20*d* such that the position sensor 78 is mounted in a stable, fixed position relative to the diaphragm casing 20. In this example, the position sensor 78 is a linear transducer. However, other types of position sensors may be used, depending on the type of valve and actuator being tested and/or other considerations. The grip pliers 310 clamp fixedly to the upper and lower bolt flanges 20*c*, 20*d* and can be adjusted to clamp to bolt flanges having a wide range of different thicknesses. A top or first end 316 of the extension rail 312 is attached to the grip pliers 310, and the sensor bracket 314 is attached to the extension rail 312 at any one of several positions along the extension rail as described hereinafter. The position sensor 78 is attached to the sensor bracket 314.

The grip pliers 310 are preferably basically similar to the grip pliers 210, including the handle 220, upper jaw 222, guide rail 224, lower jaw 226, and clamp linkage 228, except that the guide rail 224 may optionally have only one hole 230 disposed therethrough located at the bottom or distal end of the guide rail. Therefore, the same reference signs are used to indicate corresponding components in the drawings, and for brevity, the reader is referred to the previous description of the grip pliers 210 and individual components. The grip pliers 310 may also include additional holes 230 through the guide rail 224 if desired to provide additional functionality as described previously.

Figure 10:
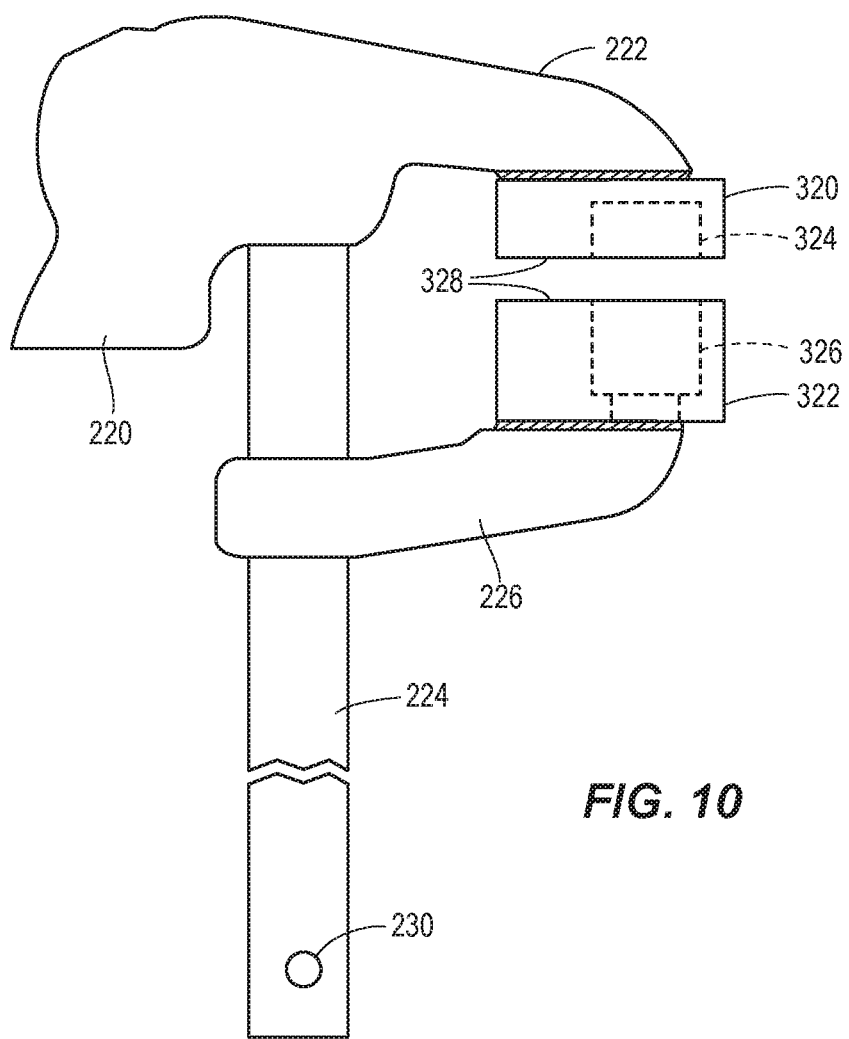
FIG. 10 is an enlarged partial side view of jaws and clamp pads of grip pliers of the position sensor mount of FIGS. 8 and 9.
Figure 11:
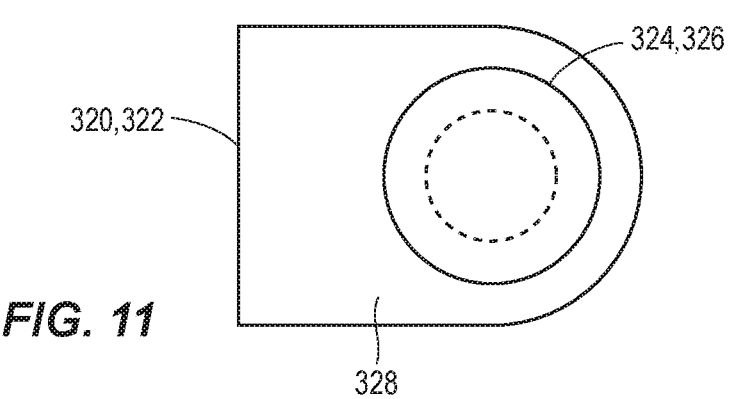
FIG. 11 is a detail top view of the clamp pads of FIG. 10.

In addition, the upper and lower jaws 222, 226 include different clamp pads 320, 322 than the grip pliers 210. Thus, rather than having generally flat or slightly serrated clamp pads (as in the grip pliers 210), the grip pliers 310 include an upper clamp pad 320 attached to bottom surface of the upper jaw 222 and a lower clamp pad 322 attached to the upper surface of the lower jaw 226 such that the upper and lower clamp pads 320, 322 have clamping surfaces 328 that are directly facing and opposite each other to engage and clamp against a work piece disposed therebetween. Preferably, the clamping surfaces 328 are parallel to each other and perpendicular to the axis of the guide rail 224. As best seen in FIGS. 9-11, the upper clamp pad 320 includes an upper receiver 324 in the clamping surface 328, and the lower clamp 322 includes a lower receiver 326 in the clamping surface 328. Each of the upper receiver 324 and the lower receiver 326 is shaped and sized to receive a bolt head and/or a nut and the distal end of a bolt, such as found on the bolts 104 used to bolt together the upper casing 20*a* and the lower casing 20*b* of the diaphragm casing 20. In this arrangement, each of the receivers 324 and 326 is in the form of a recess, such as a blind bore, extending into the clamping surface 328 of each clamp pad 320 and 322. In addition, the lower receiver 326 is in the form of a counter sunk blind bore to receive the distal end of a bolt that extends through the nut. The shape and sizes of the receivers 324, 346 may be the same or different from each other and may be selected to receive particular sizes of bolt heads and/or nuts. In one example, each of the upper receiver 324 and 326 has an circular inner perimeter having an inside diameter between about ½ inch (1.2 cm) and about 2 inches (5 cm) and a depth between about ½ inch (1.2 cm) and about 2 inches (5 cm). However, other shapes and/or sizes may be used, depending on the specific geometric properties of the bolts to be received within the receivers 324 and 326. Further, the upper and lower receivers 324, 326 in some arrangements may have the same shape and size or have different shapes and sizes. The upper and lower receivers 324, 326 may be switched on the upper and lower jaws 222, 226. Many other variations are also possible, as long as the receivers 324 and 326 are arranged to receive the opposite ends of any one of the bolts 104 that extend through the flanges 20*c* and 20*d* to bolt the upper and lower casings 20*a* and 20*b* together. The receivers 324, 326 allow the jaws 222 and 226 to be clamped over the opposite ends of any one of the bolts 104 with the clamping surfaces 328 pressed flat against the opposite surfaces of the blot flanges 20*c*, 20*d*, as illustrated in FIG. 8, which prevents the grip pliers 310 from sliding or slipping off of the bolt flanges. By receiving the ends of a bolt, the receivers 324, 326 also provide improved stability and resistance against torsional forces. The clamp pads 320, 322 could be used on the grip pliers 210 if desired.

The extension rail 312 is in the form of an elongate hollow tube member with longitudinal slits 330 and aligned bolt holes 332 at the first end 316 for coupling to the guide rail 224, and one or more sets of aligned bolt holes 334 spaced longitudinally from the first end 316 to the second end for coupling the sensor bracket 314. The aligned bolt holes 332 are in two opposing sides of the hollow tube member, and the slits 330 extend longitudinally from the ends of the other two opposing sides of the hollow tube member. The bottom end of the guide rail 224 fits into the top end 316 of the extension rail 312, and a bolt 336 is inserted through the bolt holes 332 and the aperture 230 to fasten the extension rail 312 to the guide rail 224. The bolt 336 can be tightened with a nut to draw the opposing sides of the hollow tube member together along the longitudinal slits 330 and thereby clamp the first end of the extension rail 312 tightly and fixedly to the bottom end of the guide rail 224. Thus, the longitudinal slits 330 and the bolt holes 332 provide for a stable connection with the grip pliers 310.

The sensor bracket 314 includes a flat plate 340 and an angle 342. The flat plate 340 has an elongate shape extending from a first end to a second end. A guide hole 344 through the first end of the flat plate 340 is shaped to receive the extension rail 312 therethrough. The angle 342 is fixedly connected to a top side of the flat plate 340 adjacent the guide hole 344, for example with fasteners or welds, such that a vertical flange of the angle 342 extends adjacent the hole and perpendicular to the flat plate 340. A bolt hole (not visible) extends through the vertical flange. The extension rail 312 slides through the guide hole 344, and the bolt hole through the vertical flange can be aligned with any one of the sets of bolt holes 334 such that a bolt 346 or other fastener can be inserted to fixedly couple the sensor bracket 314 in any selected one of several possible positions along the extension rail 312.

The sensor bracket 314 also includes one or more mount apertures 350 for mounting the position sensor 78 to the bottom side of the flat plate 340. The mount aperture 350 is in the form of an elongate slot, which allows the position sensor 78 to be adjusted to any of an infinite number of positions along the length of the flat plate 340. However, the mount aperture may be a hole or may even include a discrete number of holes and/or slots to provide a discrete number of mounting locations for the position sensor 78 or for mounting multiple position sensors 78.

As best seen in FIG. 8, the grip pliers 310 are clamped onto the upper and lower bolt flanges 20c, 20d over the opposing ends of one of the bolts 104. The extension rail 312 extends downwardly from the bottom end of the guide rail 224, and the sensor bracket 314 is locked into a selected position along the extension rail 312 to locate the position sensor 78 at a desired vertical position along the spring barrel 26 for sensing the position and movement of the valve plug or associated component. The position sensor 78 can further be adjusted to a selected horizontal position closer or further away from the spring barrel 40 along the elongate slot of the mount aperture 350. Thus, the position sensor mount 300 provides a versatile, stabile, and easily installed mechanism for mounting the position sensor 78 to any of many different types, sizes, and shapes of valves and actuators. Further, as can be seen in FIGS. 8 and 9, the sensor bracket 314 may be mounted to the extension rail 312 in either a right-side-up or an upside down orientation.

Figure 12:
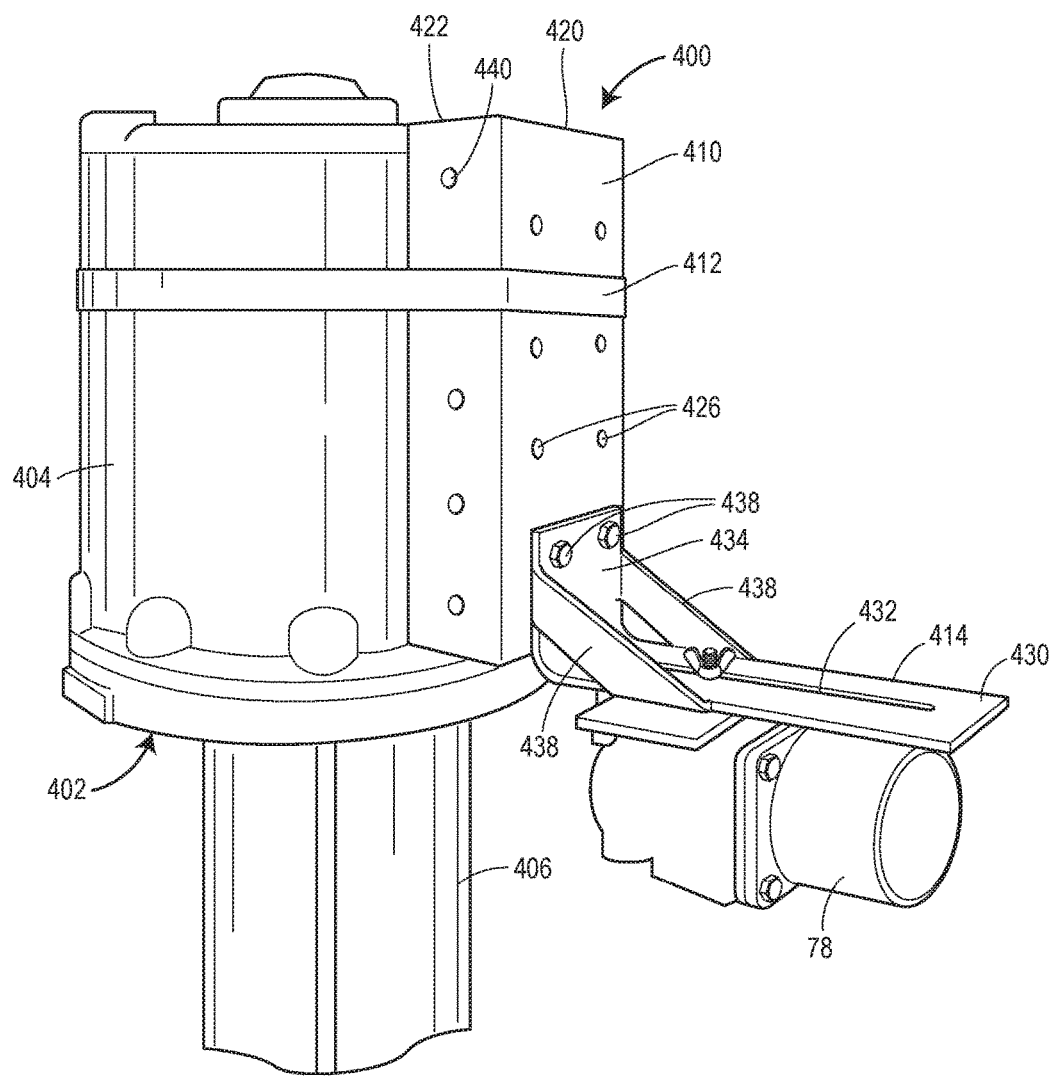
FIG. 12 illustrates a position sensor mount for a diagnostic system for fluid control valves according to a fourth arrangement mounted to an actuator body.
Figure 13:
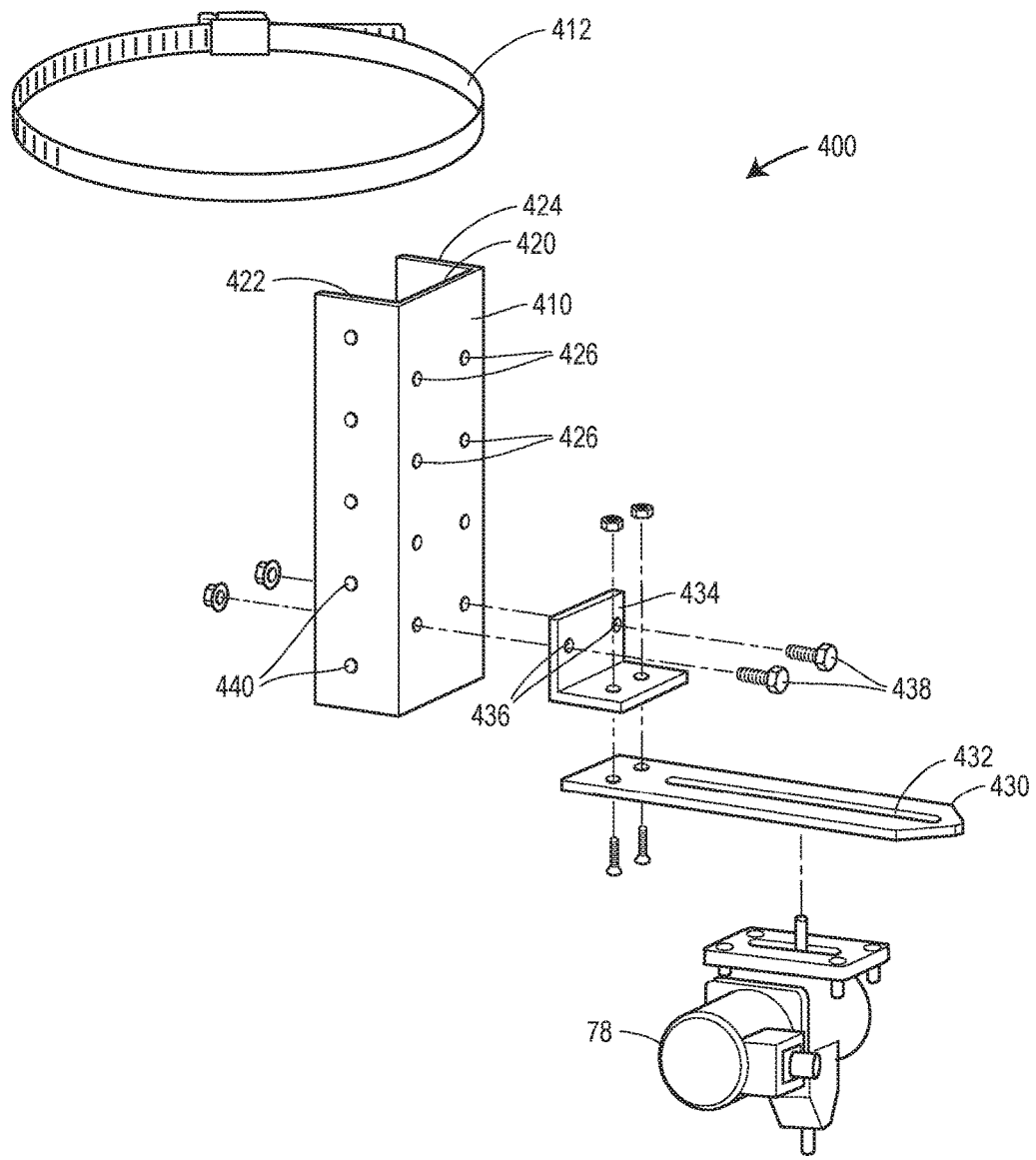
FIG. 13 is an exploded perspective view of the position sensor mount of FIG. 8.

Turning now to FIGS. 12 and 13, a fourth position sensor mount 400 is illustrated. FIG. 12 illustrates the sensor mount 400 in one possible position mounting the position sensor 78 to an actuator 402. The actuator 402 is a linear piston actuator having a piston casing or cylinder 404 that houses a piston and a yoke 406 extending downwardly from the piston casing 404, in a manner well understood in the art.

The sensor mount 400 includes a channel bracket 410, a band clamp 412, and a sensor bracket 414. The channel bracket 410 is clamped to the piston casing 404 with the band clamp 412, and the sensor bracket 414 mounts the position sensor 78 to the channel bracket 410.

The channel bracket 410 is a C-section channel having a web 420 and two flanges 422, 424 extending from opposite edges of the web to form a C-section that extends longitudinally between opposite top and bottom ends. A plurality of sets of mounting apertures 426, each set preferably including two apertures, are formed through the web 420, the sets spaced apart longitudinally along the web between the top and bottom ends. Each set of mounting apertures 426 is preferably aligned perpendicular to the longitudinal axis of the channel bracket 410.

The sensor bracket 414 is in the form of an L-section or angle having a flat plate 430 with a mounting aperture 432 for coupling to the position sensor 78 and a flange 434 that seats against the web 420. The flange 434 includes a set of mounting apertures 436, which are spaced and sized to correspond to each set of the mounting apertures 426. A pair of struts 438 extending at an angle from the plate 430 to the flange 434 may optionally be included to provide additional structural, geometric stability to the sensor bracket 414, as shown in FIG. 12. However, in other arrangements, the flange 434 may formed by an angle section that is fastened to one end of the plate 430, for example with bolts, screws, or welds, as illustrated in FIG. 13.

Additional optional mounting apertures 440 extend through each of the flanges 422 and 424. The mounting apertures 440 are spaced and sized so as to align with the mounting apertures 436 in the flange 434 so that the sensor bracket 414 can optionally be mounted against either of the flanges 422 or 424. This arrangement may provide a more stable mounting position for the sensor bracket 414 when the piston casing 404 is aligned horizontally rather than vertically.

The mount aperture 432 is in the form of an elongate slot, which allows the position sensor 78 to be adjusted to any of an infinite number of positions along the length of the flat plate 430. However, the mount aperture 432 may be hole or may even include a discrete number of holes and/or slots to provide a discrete number of mounting locations for the position sensor 78 or for mounting multiple position sensors 78.

The band clamp 412 may be any type of flexible or semi-flexible strap that can be wrapped around and tightened to form a clamp around something. The band clamp 412 may be, for example, in the form of a band clamp with an advancing screw tightening mechanism or a ratchet strap with a ratcheting tightening mechanism. Other types of band clamps that provide sufficient strength and durability to clamp the channel bracket 410 to the actuator 402 under expected diagnostic testing conditions may also be used.

To mount the position sensor 78 to the actuator 402, the mounting apertures 436 are aligned with any selected set of the mounting apertures 426, and bolts 438 are inserted through aligned mounting apertures 436, 426 to fasten the sensor bracket 414 in a selected, fixed, stable position against the channel bracket 410. The distal ends of the flanges 422 and 424 are placed against the piston casing 404, and the band clamp 412 is looped around the outside of both the piston casing 404 and the channel bracket 410. Then, the band clamp 412 is drawn tight to securely and fixedly attach the channel bracket 410 to the piston casing 404. The position sensor 78 is fastened to the plate 430 at the mounting aperture 432, for example with a nut and bolt. The sensor flange 434 is fastened to the channel bracket 410 in any selected one of several possible positions as described above. The position sensor 78 is adjusted along the length of the mounting aperture 432 to a selected position closer to or further away from the piston casing 404. Thus, the position sensor mount 400 provides a versatile and easily installed mount assembly that provides improved stability and flexibility for mounting the position sensor 78 to piston actuators or any actuator that has an elongate cylindrical surface to which the channel bracket 410 can be clamped.

This detailed description is to be construed as examples only and does not describe every possible embodiment, as describing every possible embodiment would be impractical, if not impossible. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

We claim:

1. A position sensor mount for a diagnostic system for fluid control valves, comprising:
   a base having a mount for coupling to a position sensor and a first clamp jaw;
   a toggle clamp fixedly attached to the base, the toggle clamp having a main body coupled to the mount and a second clamp jaw that opposes the first clamp jaw and is pivotably coupled to the main body, wherein the toggle clamp automatically adjusts to provide a fixed clamping force at different distances between the first clamp jaw and the second clamp jaw; and
   an engagement assembly carried by the second jaw, wherein the engagement assembly includes at least a first clamp pad having a distal end that directly faces the first clamp jaw and swivels relative to the second clamp jaw.

2. The position sensor mount of claim 1, wherein the first clamp pad includes a swivel joint that allows the clamp pad to swivel.

3. The position sensor mount of claim 1, wherein the engagement assembly further comprises:
   a separating arm carried by the second clamp jaw, wherein the separating arm extends transverse to the second clamp jaw;
   the first clamp pad carried by the separating arm; and
   a second clamp pad carried by the separating arm, the second clamp pad having a distal end that directly faces the first clamp jaw and swivels relative to the second clamp jaw,
   wherein the first and second clamp pads are disposed on opposite lateral sides of the separating arm.

4. The position sensor mount of claim 1, wherein the first clamp pad is tilted inwardly at an angle toward the toggle clamp from the second clamp jaw such that a distal end of the first clamp pad is parallel with the first clamp jaw when the second clamp jaw is disposed at a non-parallel angle away from the first clamp jaw.

5. The position sensor mount of claim 1, wherein the first clamp pad includes a soft covering.

6. The position sensor mount of claim 1, wherein the first clamp jaw includes a receiver facing the second clamp jaw, and wherein the receiver is shaped and sized to receive the end of a bolt therein.

7. The position sensor mount of claim 1 in combination with a valve actuator, wherein the first and second clamp jaws are clamped onto the valve actuator.

8. A position sensor mount for a diagnostic system for fluid control valves, comprising:
   grip pliers having first and second jaws that clamp onto bolt flanges of a diaphragm casing, the grip pliers including a guide rail extending downwardly from the first and second jaws;
   a sensor bracket for carrying a position sensor; and
   an articulating arm having a first end coupled to the guide rail and a second end releasably coupled to the sensor bracket,
   wherein the articulating arm has a combination of arms and pivot joints arranged such that the sensor bracket can be adjusted in six degrees of freedom relative to the grip pliers.

9. The position sensor mount of claim 8, further comprising:
   a plurality of apertures through the guide rail, the apertures spaced longitudinally apart from each other along the length of the guide rail; and
   the first end of the articulating arm having a connector that releasably fastens to every one of the apertures, whereby the articulating arm can be selectively fastened to the guide rail at any one of the apertures.

10. The position sensor mount of claim 8,
   wherein the sensor bracket includes an elongate plate extending from a first end to a second end, a first aperture through the first end, and second aperture through the second end, wherein a connector at the second end of the articulating arm releasably fastens to the first aperture and the position sensor is fastened to the second aperture.

11. The position sensor mount of claim 8 in combination with a valve actuator, wherein the first and second jaws of the grip pliers are clamped onto the valve actuator.

12. A position sensor mount for a diagnostic system for fluid control valves, comprising:
   grip pliers having first and second jaws that clamp onto bolt flanges of a diaphragm casing, the grip pliers including a guide rail extending downwardly from the first and second jaws;
   a sensor bracket for carrying a position sensor; and
   an extension rail extending between a first end and a second end, the first end releasably fastened to the guide rail, and a plurality of holes through the extension rail and spaced apart longitudinally between the first end and the second end,
   wherein the sensor bracket can be releasably fastened at a plurality of different locations along the extension rail with a fastener that fastens the sensor bracket to each of the plurality of holes.

13. The position sensor mount of claim 12, wherein the sensor bracket includes a guide hole that slidingly receives the extension rail therethrough, wherein the sensor bracket can slide along the extension rail to any one of the plurality of holes through the extension rail.

14. The position sensor mount of claim 12, wherein the sensor bracket includes a mounting aperture, and the position sensor is fastened to the sensor bracket at the mounting aperture.

15. The position sensor mount of claim 14, wherein the mounting aperture comprises an elongate slot, and the position sensor can be fastened at each of an infinite number of positions along the elongate slot.

16. The position sensor mount of claim 12, wherein the extension rail comprises an elongate hollow tube member, and the bottom end of the guide rail fits into the first end of the extension rail.

17. The position sensor mount of claim 16, wherein, at the first end of the extension rail, a pair of aligned bolt holes extend through first and second opposing sides of the hollow tube member, and a pair of slits extend longitudinally from the first end of third and fourth opposing sides of the hollow tube member, wherein the first end is releasably fastened to the guide rail with a fastener that extends through the pair of aligned bolt holes and another hole through the bottom end of the guide rail.

18. The position sensor mount of claim 12, further comprising:
   a first clamp pad carried by the first clamp jaw and having a first clamping surface; and
   a second clamp pad carried by the second clamp jaw and having a second clamping surface;
   each of the first and second clamping surfaces directly facing and opposite each other;
   the first clamp pad including a first receiver in the first clamping surface;
   the second clamp pad including a second receiver in the second clamping surface,
   wherein each of the first receiver and the second receiver is shaped and sized to receive a bolt head and/or a nut and the distal end of a bolt.

19. The position sensor mount of claim 18,
   wherein the second receiver is a counter sunk bore.

20. The position sensor mount of claim 12 in combination with a valve actuator, wherein the first and second jaws of the grip pliers are clamped onto the valve actuator.

21. A position sensor mount for a diagnostic system for fluid control valves, comprising:
   a channel bracket having a web and first and second flanges, and first mounting apertures through the web;
   a strap to clamp the channel bracket to an actuator casing; and a sensor bracket with a second mounting aperture and a third mounting aperture,
wherein the second mounting aperture can be selectively aligned with each of the first mounting apertures and a bolt extending through one of the first mounting apertures and the second mounting aperture fastens the sensor bracket to the web of the channel bracket, and
wherein a position sensor is coupled to the sensor bracket at the third mounting aperture.

22. The position sensor mount of claim 21, wherein the sensor bracket includes a flat plate and a flange at a first end of the plate, wherein the second aperture extends through the flange and the third aperture extends through the flat plate.

23. The position sensor mount of claim 21, and comprising:
fourth mounting apertures extending through the first and second flanges,
wherein the second mounting aperture can be selectively aligned with each of the fourth mounting apertures and a bolt extending through one of the fourth mounting apertures and the second mounting aperture fastens the sensor bracket to the flange of the channel bracket.

24. The position sensor mount of claim 21 in combination with a valve actuator, wherein the channel bracket is clamped to the valve actuator with the strap.

* * * * *

UNITED STATES PATENT AND TRADEMARK OFFICE
CERTIFICATE OF CORRECTION

PATENT NO. : 10,458,820 B2
APPLICATION NO. : 15/178060
DATED : October 29, 2019
INVENTOR(S) : Philip D. Nelson et al.

It is certified that error appears in the above-identified patent and that said Letters Patent is hereby corrected as shown below:

In the Specification

At Column 3, Line 63, "9; and" should be -- 9; --.

At Column 7, Line 33, "spring 22" should be -- spring 24 --.

At Column 9, Line 53, "main body 112" should be -- main body 124 --.

At Column 9, Line 56, "main body 112" should be -- main body 124 --.

At Column 11, Line 48, "attaché" should be -- attached --.

At Column 11, Line 62, "an diaphragm" should be -- a diaphragm --.

At Column 13, Line 1, "distal end 234 of the arm" should be -- distal end of the arm 234 --.

At Column 13, Line 60, "located" should be -- locate --.

At Column 14, Line 7, "handle 22)" should be -- handle 220) --.

At Column 17, Line 13, "spring barrel 40" should be -- spring barrel 26 --.

Signed and Sealed this
Twenty-seventh Day of October, 2020

Andrei Iancu
*Director of the United States Patent and Trademark Office*